United States Patent
Kinoshita

(10) Patent No.: US 10,547,774 B2
(45) Date of Patent: Jan. 28, 2020

(54) IMAGE PROCESSING DEVICE, IMAGE PROCESSING METHOD, AND PROGRAM

(71) Applicant: Sony Corporation, Tokyo (JP)

(72) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/655,621

(22) PCT Filed: Nov. 12, 2013

(86) PCT No.: PCT/JP2013/080606
§ 371 (c)(1),
(2) Date: Jun. 25, 2015

(87) PCT Pub. No.: WO2014/109125
PCT Pub. Date: Jul. 17, 2014

(65) Prior Publication Data
US 2015/0350523 A1    Dec. 3, 2015

(30) Foreign Application Priority Data
Jan. 9, 2013    (JP) ................................ 2013-001798

(51) Int. Cl.
*H04N 5/232* (2006.01)
*H04N 5/235* (2006.01)
(Continued)

(52) U.S. Cl.
CPC ..... *H04N 5/23212* (2013.01); *G06K 9/00228* (2013.01); *G06T 5/002* (2013.01);
(Continued)

(58) Field of Classification Search
None
See application file for complete search history.

(56) References Cited

U.S. PATENT DOCUMENTS 9,266,473 B1 *  2/2016  Elwell ................... B60W 40/09
2001/0002225 A1 *  5/2001  Sekine .................. G01S 3/7864
                                                                396/55
(Continued)

FOREIGN PATENT DOCUMENTS

CN   101339349 A   1/2009
CN   101426088 A   5/2009
(Continued)

OTHER PUBLICATIONS

Title: Translation of JP2010152162 Author: Tomosada, Toshihiko Date: Jul. 2010.*

(Continued)

*Primary Examiner* — Twyler L Haskins
*Assistant Examiner* — Wesley J Chiu
(74) *Attorney, Agent, or Firm* — Michael Best & Friedrich LLP

(57) ABSTRACT

There is provided an image processing device including a subject distance change determination unit configured to detect a temporal change of a distance from an imaging position to each subject present in an image and determine a tendency toward approach or recession of the each subject with respect to the imaging position on the basis of the detection, and a main subject determination unit configured to determine a main subject on the basis of the tendency toward approach or recession of the each subject determined by the subject distance change determination unit.

22 Claims, 19 Drawing Sheets

(51) Int. Cl.
*G06K 9/00* (2006.01)
*G06T 5/00* (2006.01)

(52) U.S. Cl.
CPC ....... *H04N 5/2353* (2013.01); *H04N 5/23219* (2013.01); *H04N 5/23296* (2013.01); *G06T 2207/10024* (2013.01)

(56) References Cited

U.S. PATENT DOCUMENTS

| | | | |
|---|---|---|---|
| 2006/0012681 A1* | 1/2006 | Fujii | H04N 7/181 348/169 |
| 2006/0066742 A1* | 3/2006 | Miyata | H04N 1/00413 348/333.01 |
| 2006/0125919 A1* | 6/2006 | Camilleri | B60R 1/00 348/148 |
| 2007/0195371 A1* | 8/2007 | Shimosato | G06F 17/3028 358/1.18 |
| 2008/0031611 A1 | 2/2008 | Konishi | |
| 2009/0109304 A1* | 4/2009 | Guan | H04N 5/23212 348/240.99 |
| 2010/0265353 A1* | 10/2010 | Koyama | H04N 5/23232 348/222.1 |
| 2011/0044676 A1 | 2/2011 | Kikuchi et al. | |
| 2011/0149120 A1* | 6/2011 | Kubota | H04N 5/232 348/240.99 |
| 2011/0211073 A1* | 9/2011 | Foster | H04N 5/232 348/164 |
| 2012/0206619 A1 | 8/2012 | Nitta et al. | |
| 2012/0219183 A1* | 8/2012 | Mori | G06T 7/20 382/103 |
| 2013/0258167 A1* | 10/2013 | Gum | H04N 5/23212 348/349 |

FOREIGN PATENT DOCUMENTS

| | | |
|---|---|---|
| JP | 2002-228920 A | 8/2002 |
| JP | 4720673 | 2/2008 |
| JP | 2008-052225 A | 3/2008 |
| JP | 2008-281701 A | 11/2008 |
| JP | 2010-041076 A | 2/2010 |
| JP | 2010152162 A * | 7/2010 |
| JP | 2011-146826 A | 7/2011 |
| JP | 2011-146827 A | 7/2011 |
| JP | 2011-160379 A | 8/2011 |
| JP | 2011-166305 A | 8/2011 |

OTHER PUBLICATIONS

International Search Report; International Application No. PCT/JP2013/080606; International Filing Date: Nov. 12, 2013; Date of completion of the international search: Dec. 3, 2013.
Written Opinion of the International Searching Authority; International Application No. PCT/JP2013/080606; International Filing Date: Nov. 12, 2013; Date of Written Opinion: dated Dec. 10, 2013.
Extended European Search Report dated Aug. 24, 2016 for corresponding European Application No. 13870934.0.
Chinese Office Action dated Sep. 6, 2017 for corresponding Chinese Application No. 201380069149.9.
Japanese Office Action dated Oct. 17, 2017 for corresponding Japanese Application No. 2014-556331.
Chinese Office Action dated Apr. 10, 2018 for corresponding Chinese Application No. 201380069149.9.
Extended European Search Report dated Sep. 5, 2019 for corresponding European Application No. 19178866.0.

* cited by examiner

FIG. 12
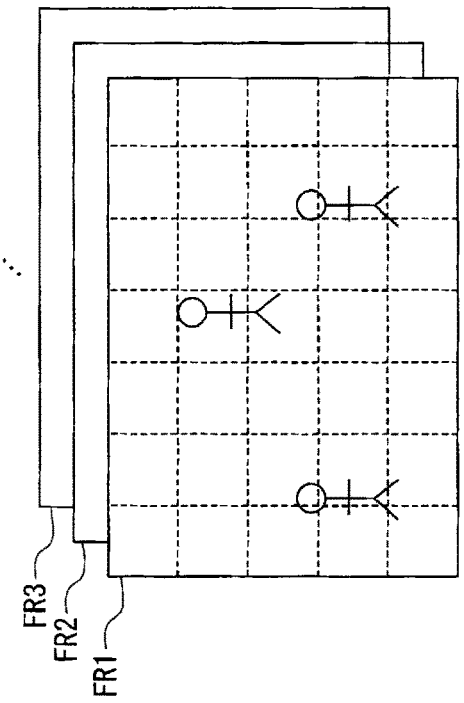
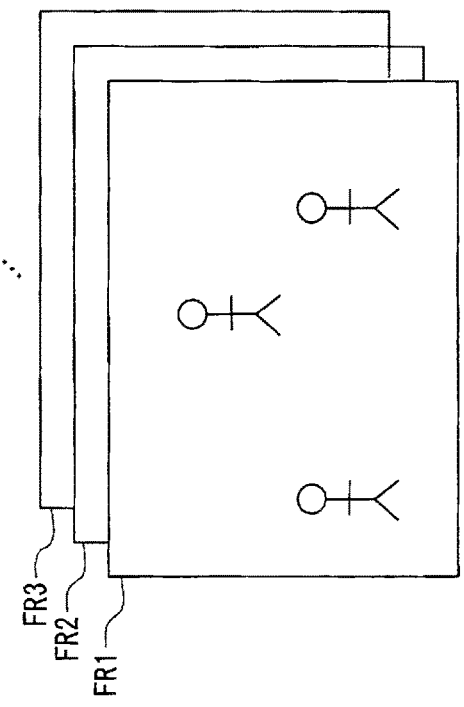
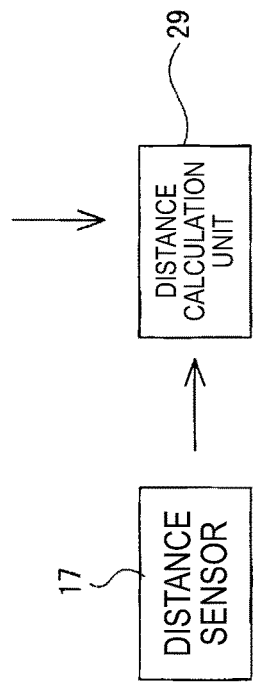

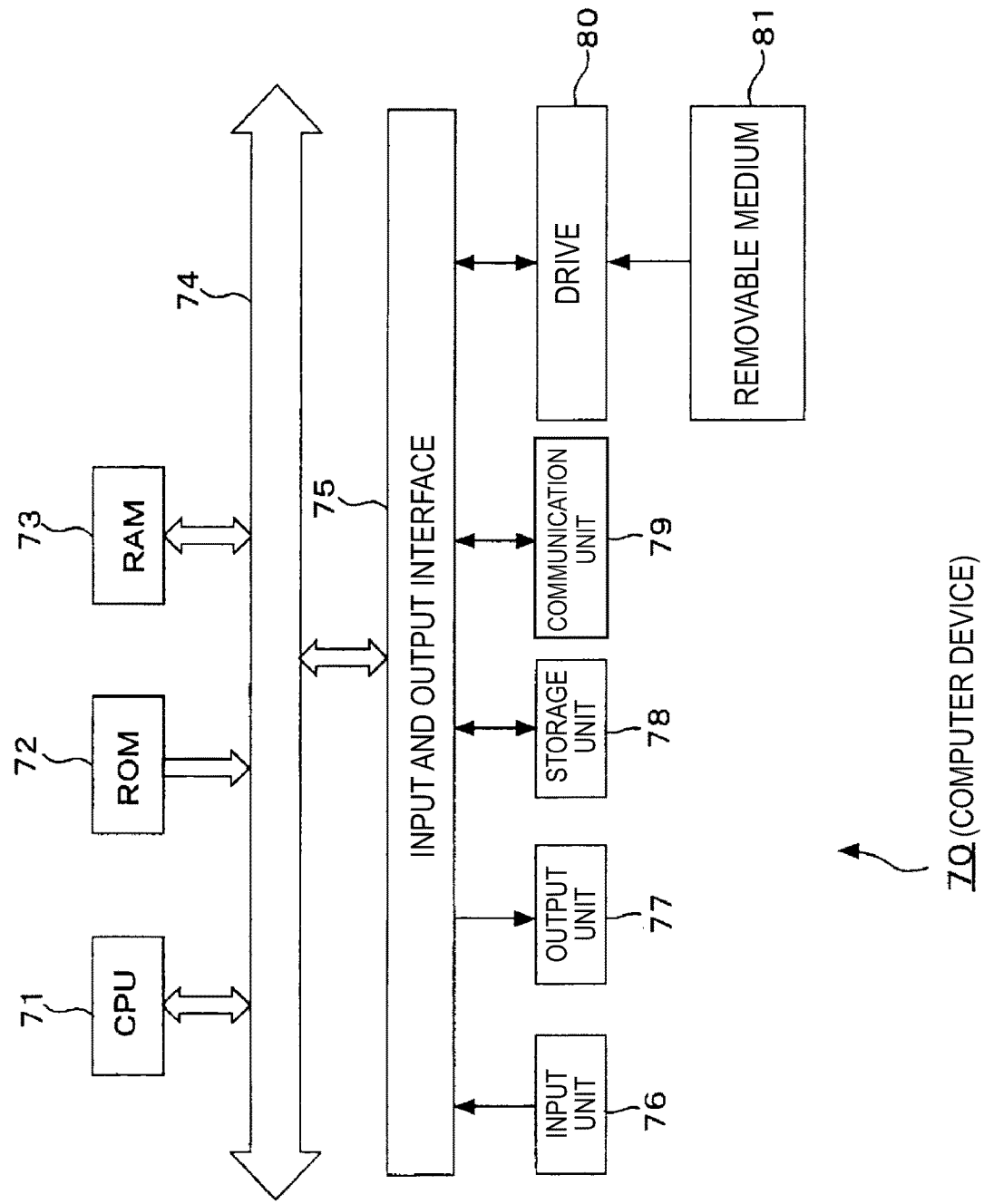

IMAGE PROCESSING DEVICE, IMAGE PROCESSING METHOD, AND PROGRAM

TECHNICAL FIELD

The present disclosure relates to an image processing device, an image processing method, and a program for performing a process of determining a main subject in an image.

BACKGROUND ART

Recent digital still cameras and digital video cameras normally have a facial detection function, and have a function of optimally matching various parameters (focus, brightness and the like) of the camera according to facial position and area.

On the other hand, Patent Literature 1 discloses a technique in which a user designates and selects a "main subject" that is a target subject to be tracked in a captured image.

In addition, if the techniques disclosed in Patent Literatures 2, 3, and 4 described above are used, for example, subject tracking that encompasses a frame of the whole body of an arbitrary subject can be realized.

In addition, there are also functions of controlling an optical system and the like such as autofocus and automatic exposure such that a desired area in a captured image is detected and traced so as to optimize the area.

As described above, technologies of tracking an image designated by a user as a main subject, for example, an image area such as a face in a captured image, focusing on the face area, and the like are known.

CITATION LIST

Patent Literature

Patent Literature 1: JP 2011-166305A
Patent Literature 2: JP 2011-146826A
Patent Literature 3: JP 2011-146827A
Patent Literature 4: JP 2011-160379A

SUMMARY OF INVENTION

Technical Problem

However, in a captured image, a desired area that is subject to tracking or focusing, i.e., a "main subject," is decided by a photographer by directly selecting one candidate from "a plurality of candidate areas" obtained from various detectors using any method at present.

In a state of holding a camera, for example, a main subject is chosen through an action of selecting an arbitrary face from a plurality of faces projected on a through image displayed on a screen (a monitoring image of a subject displayed at times other than at a time of manipulating a shutter) on a touch panel. Alternatively, a subject present in a predetermined area is set to be a main subject at a time designated by a user (half-pressing of a shutter or the like).

However, when a user interface is considered in actual use examples, there are cases in which the action of "selecting a main subject by a photographer" itself is difficult.

For example, when a user wants to use a function of maintaining focus on a subject that is moving around, it is difficult for the user to select the subject using his or her finger holding a camera while targeting the subject.

For example, there are cases in which designation is difficult due to a speed of a reaction of a user to changes (movements) of a subject. For example, there is a case in which it is difficult to precisely designate a subject that is moving around on a screen of a through image.

In addition, in a situation in which a user holds a camera in his or her hand in the first place and turns the camera toward the subject to choose the subject, it is difficult for the user to perform the action of selecting a main subject using his or her finger on a screen. Particularly, in a situation in which a subject is tracked, for example, in which a user changes an imaging direction to cause a camera to move for panning or tilting, it is almost not possible to select a main subject.

In addition, there is a case in which it is difficult for a use to select a subject in resolution of a display screen in which a touch panel is arranged.

In addition, there is also a case in which it is difficult to properly designate a desired subject depending on a size of the subject on a display screen in which a touch panel is arranged and a size (thickness) of a user's finger.

In addition, there is also a case in which it is difficult for a user to properly designate a subject due to a time lag of a camera system, for example, a time lag between actual scenery and a through image of a captured image.

Furthermore, when such a designation manipulation is to be performed during imaging and recording of a dynamic image, there may be cases where image shaking caused by an action of selecting a main subject may be recorded as it is, or an user may be forced to take an action of re-selection at the time of frame-out or tracking loss (failure) caused by temporary shielding, or the like.

As described above, hand-held type cameras have a problem in that the action of selecting a main subject itself is difficult in many use examples that require the function, which is stressful for photographers.

Therefore, the present disclosure aims to realize a technology of determining a target subject desired by a user such as a photographer and setting the subject as a main subject without an action of the user intentionally selecting the subject.

Solution to Problem

According to the present disclosure, an image processing device includes a subject distance change determination unit configured to detect a temporal change of a distance from an imaging position to each subject present in an image and determine a tendency toward approach or recession of the each subject with respect to the imaging position on the basis of the detection, and a main subject determination unit configured to determine a main subject on the basis of the tendency toward approach or recession of the each subject determined by the subject distance change determination unit.

According to the present disclosure, an image processing method includes detecting a temporal change of a distance from an imaging position to each subject present in an image and determining a tendency toward approach or recession of the each subject with respect to the imaging position on the basis of the detection, and determining a main subject on the basis of the determined tendency toward approach or recession of the each subject.

According to the present disclosure, a program causing an arithmetic processing device to perform the processes for achieving the image processing device or the image processing method.

According to an embodiment of the present disclosure, the main subject determination process of determining the main subject automatically in the image data is performed.

For example, when a user holds an imaging apparatus to perform imaging, the user aims at an approaching subject or a receding subject in some cases. For example, there are cases in which a child, a friend, a pet, or the like is approaching a photographer holding a camera or cases in which a train, an airplane, a wild bird, or the like is receding from a camera. There are cases in which an approaching subject is set as an imaging target or a receding subject is set as an imaging target according to such use cases (imaging target). Thus, by determining tendencies of approach or recession with respect to imaging positions of subjects and determining a main subject based on the tendency toward approach or recession of each of the determined subjects, a subject that the user considers to be a principal or main figure can be estimated, and thus automatic main subject determination can be performed accordingly.

Advantageous Effects of Invention

According to the present disclosure, a main subject is automatically determined in a captured image, and thus it is not necessary for a user such as a photographer to perform an action of selecting the main subject. Accordingly, enhancement of product-added value including improvement of operability when imaging is performed using the imaging apparatus in which the image processing device of the present disclosure is mounted held in a hand, a reduction of stress on users, and further realization of various functions caused by automatic main subject determination can be realized.

BRIEF DESCRIPTION OF DRAWINGS

FIG. 12 is an explanatory diagram of region division blocks of the fourth embodiment.

FIG. 19 is a block diagram when an embodiment is applied to a computer device.

DESCRIPTION OF EMBODIMENTS

Hereinafter, an embodiment will be described in the following order.

<1. Configuration of an image processing device of embodiment>
<2. Configuration of an imaging apparatus>
<3. Opportunity and objective of main subject determination, etc.>
<4. First embodiment of an imaging apparatus>
<5. Second embodiment of an imaging apparatus>
<6. Third embodiment of an imaging apparatus>
<7. Fourth embodiment of an imaging apparatus>
<8. Application to a program and a computer device>
<9. Modification examples>

1. Configuration of Image Processing Device of Embodiment

Figure 1:
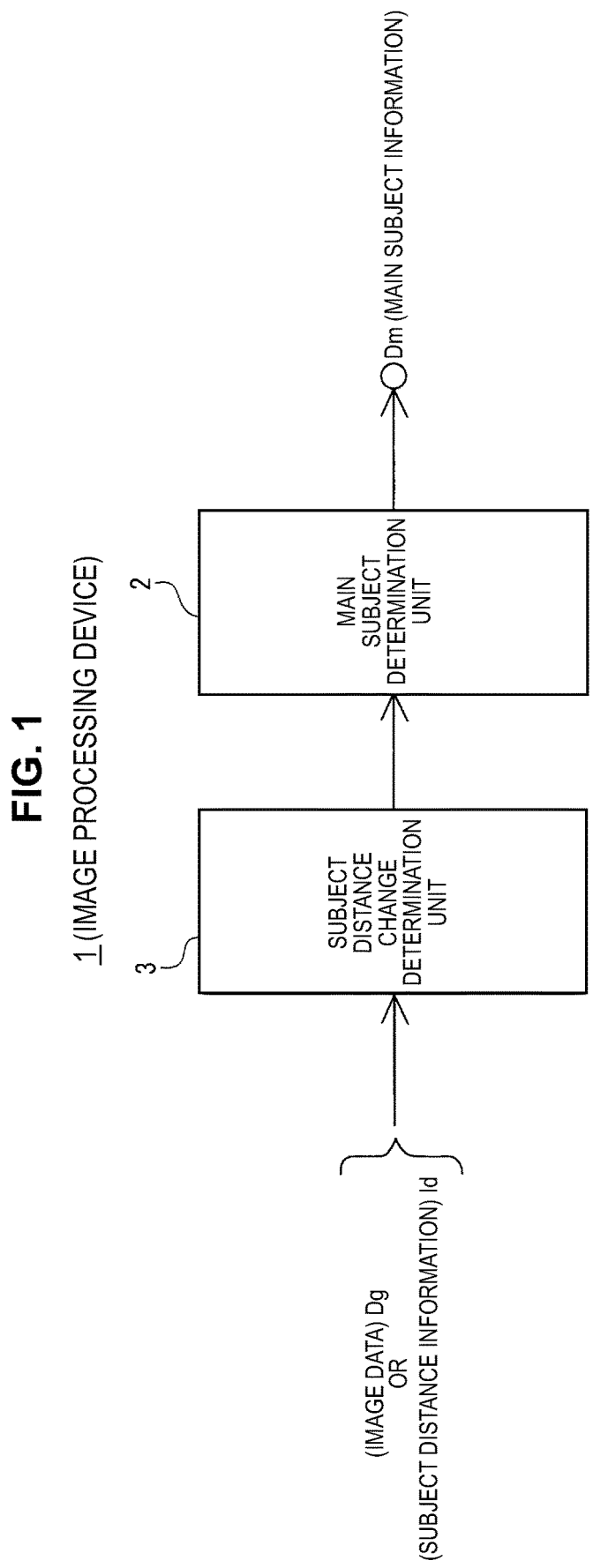
FIG. 1 is a block diagram of a configuration example of an image processing device of an embodiment of the present disclosure.

FIG. 1 shows a configuration example of an image processing device according to an embodiment.

An image processing device 1 includes a main subject determination unit 2 and a subject distance change determination unit 3.

The subject distance change determination unit 3 detects a temporal change of a distance from an imaging position with respect to a subject present in an image and determines a tendency toward approach or recession at the imaging position of the subject based on the detection. The tendency toward approach or recession is one of a tendency toward approach of a subject to approach an imaging position or a tendency toward recession of a subject to recede from an imaging position. For example, the subject distance change determination unit 3 detects a distance change of a subject in images from frame images sequentially input as image data Dg, determines an tendency toward approach or recession of the subject, and supplies sequentially the tendency toward approach or recession to the main subject determination unit 2. Specifically, a distance change from the size of a subject image is obtained and the tendency toward approach or recession is determined. Alternatively, the subject distance change determination unit 3 inputs distance information Id of the subject contained in the image data, obtains a distance change of the subject from the change in the distance information Id, and determines the tendency toward approach or recession.

The main subject determination unit 2 determines a main subject based on the tendency toward approach or recession of each subject determined by the subject distance change determination unit 3. For example, the main subject determination unit 2 determines the main subject based on a determination result of the tendency toward approach. Alternatively, the main subject determination unit 2 determines the main subject based on a determination result of a tendency toward recession. For example, some or all of the subjects having the tendency toward approach or the recession are determined as the main subjects.

Then, the main subject determination unit 2 outputs main subject information Dm as a determination result.

The image processing device 1 including the main subject determination unit 2 and the subject distance change determination unit 3 described above can be realized by a central processing unit (CPU) or a digital signal processor (DSP) serving as an arithmetic processing device.

It can also be considered that the function of the main subject determination unit 2 is realized by a CPU or the like and the function of the subject distance change determination unit 3 is realized by an image processing DSP or the like connected to the CPU or as a cooperation process.

Figure 2:
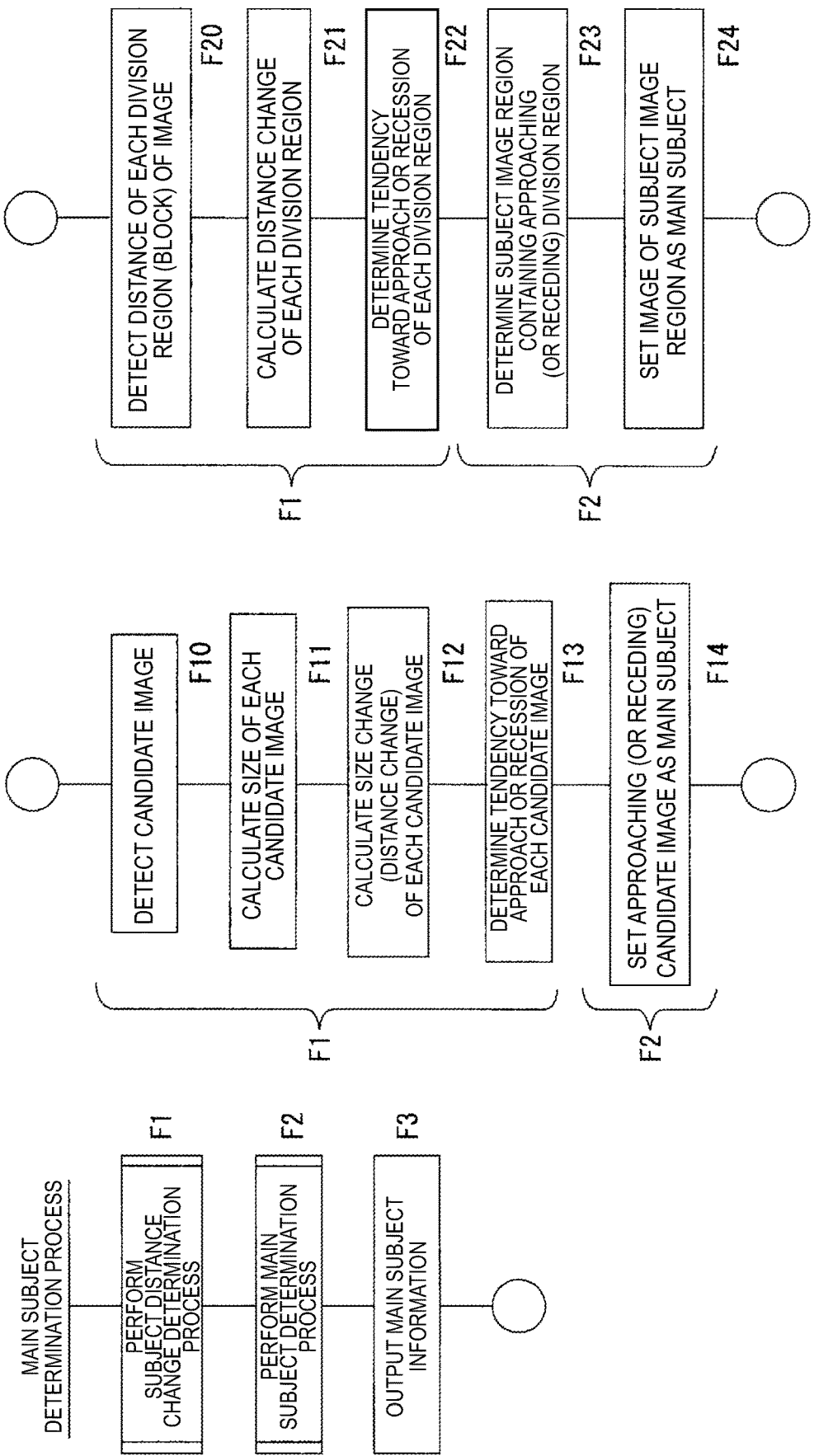
FIG. 2 is a flowchart of a main subject determination process of the image processing device of the embodiment.

The flow of a process for the main subject determination performed by the image processing device 1 is illustrated in FIG. 2A.

In Step F1, the subject distance change determination unit 3 detects the distance change of the subject contained in the image data and determines the subject in which the tendency toward approach or recession is shown.

In Step F2, the main subject determination unit 2 determines the subject in which the tendency toward approach or recession has been observed as the main subject.

In Step F3, the main subject determination unit 2 outputs the main subject information Dm which is the determination result of the main subject to transmit and receive the main subject information Dm to and from an application program or the like.

The application program or the like performs a process according to the fact that the main subject image is specified. For example, focus control, a tracking process, or an image effect process is performed.

In FIGS. 2B and 2C, two schemes are shown as specific examples of the processes of Steps F1 and F2 in FIG. 2A.

The process example of FIG. 2B is a process of detecting an image size of the subject in the image data in each frame and obtaining its size change amount to determine the tendency toward approach or recession of each subject. That is, a temporal change of a distance of the subject is detected as a size change on an image. The process of this idea is referred to as a "size determination scheme" for description. First to third embodiments to be described below will be described as examples in which the idea of the size determination scheme is used.

The process example of FIG. 2C is a process of dividing the image data into a plurality of regions and detecting a temporal change of a distance of the subject in each division region (block) in an image. The process of this idea is referred to as a "block determination scheme" for description. A fourth embodiment to be described is as an example in which the idea of the block determination scheme is used.

The size determination scheme in FIG. 2B will be described. In this case, the processes of Steps F10, F11, F12, and F13 are performed as Step F1 of FIG. 2A and Step F14 is performed as Step F2 of FIG. 2A.

In Step F10, the subject distance change determination unit 3 detects a candidate image which can become the main subject in the image data. The candidate image is, for example, a human face image, a human body image, a dog image, or a cat image. The subject distance change determination unit 3 sets one candidate image or a plurality of candidate images such as face images as the subjects present in an image through an image analysis process on the image data.

In Step F11, the subject distance change determination unit 3 calculates the size (area) of each candidate image. For example, the size is calculated using, for example, the width×height of a region of the candidate image or the number of pixels of the candidate image.

In Step F12, the subject distance change determination unit 3 calculates a size change of each candidate image. For example, a difference between the size of a candidate image of a current processing target frame in continuous pieces of frame image data and the size of the candidate image in the frame image data before a unit time (for example, one frame before) is calculated. The size of the candidate image on the image corresponds to a distance between an imaging position (which is a position of the imaging apparatus with which a cameraman performs imaging) and a subject considered as the candidate image. Accordingly, when the subject that is a candidate image is approaching, the size increases with the progress of the frames. When the subject that is a candidate image is receding, the size decreases with the progress of the frames. That is, the size change can be comprehended as a distance change.

In Step F13, the subject distance change determination unit 3 determines the tendency toward approach or recession of each candidate image. For example, when the size change is observed during a span of some time and the subject approaches as the candidate image, the size of the subject gradually increases. That is, the size change amount in a size expansion direction is observed on average, cumulatively, or continuously to some extent. In this case, the candidate image can be determined to have the tendency toward approach at the imaging position.

In contrast, when the subject recedes as the candidate image, the size of the subject gradually decreases. That is, the size change amount in a size contraction direction is observed on average, cumulatively, or continuously to some extent. In this case, the candidate image can be determined to have the tendency toward recession at the imaging position.

In Step F14, the main subject determination unit 2 selects the candidate image having the tendency toward approach or the recession and sets the subject of the candidate image as the main subject.

Through the above-described process, the subject approaching the imaging position can be automatically determined to be the main subject or, in contrast, the subject receding from the imaging position can be automatically determined to be the main subject.

Next, the block determination scheme of FIG. 2C will be described. In this case, the processes of Steps F20, F21, and F22 are performed as Step F1 of FIG. 2A and the processes of Steps F23 and F24 are performed as Step F2 of FIG. 2A.

In Step F20, the subject distance change determination unit 3 detects a subject distance of each of the division regions (blocks) which are a plurality of regions divided from the image data. As will be described in detail below, the division region (block) refers to one of the regions which are a plurality of regions divided from one image, as indicated by the dotted lines of FIG. 12B. In Step F20, distance information of the subject depicted in the division region is detected in each division region.

In Step F21, the subject distance change determination unit 3 calculates the distance change in regard to each division region. For example, a difference of the subject distance between each division region of the current processing target frame in continuous frame image data and each division region in the frame image data before the unit time (for example, one frame before) is calculated. Thus, the distance change of the subject in each division region is calculated.

In Step F22, the subject distance change determination unit 3 determines the tendency toward approach or recession of each division region. For example, when the distance change is observed during a span of some time and the subject of the division region approaches, the value of the distance gradually decreases and the distance change amount in a direction in which the distance is shortened is observed on average, cumulatively, or continuously to some extent. In this case, the subject of the division region can be determined to have the tendency toward approach at the imaging position.

In contrast, when the subject of the division region recedes, the value of the distance gradually increases and the distance change amount in a direction in which the distance is lengthened is observed on average, cumulatively, or continuously to some extent. In this case, the subject of the division region can be determined to have the tendency toward recession at the imaging position.

In Step F23, the main subject determination unit 2 determines a subject image region containing the division region in which there is the tendency toward approach or the recession. The division regions are divided from an image region and do not correspond to regions of a subject image in a one-to-one manner. For example, one subject image is present over the plurality of division regions in many cases. Thus, the main subject determination unit 2 determines a region range of one subject image under conditions of, for example, a region (an adjacent region or a region also adjacent to the adjacent region) which has substantially the same value of the subject distance as that of the division region having the tendency toward approach or the recession and is continuous with this division region.

Then, in Step F24, the subject image in the determined region range is determined to be a main subject.

Through the above-described process, the subject approaching the imaging position can be automatically determined to be the main subject or, in contrast, the subject receding from the imaging position can be automatically determined to be the main subject.

In the image processing device 1 in FIG. 1, the main subject determination is performed as in each of the above-described examples, so that the subject intended as a target by the user can be estimated by a motion (approaching/receding) of the subject. Thus, the main subject determination can be performed automatically without dependency on a manual manipulation of the user. Accordingly, the image processing device 1 in FIG. 1 is mounted on any of the various electronic apparatuses performing an operation according to the setting of the main subject, thereby considerably improving the operability of the user.

2. Configuration of Imaging Apparatus

Hereinafter, the main subject determination process will be described in detail exemplifying the imaging apparatus 10 including the above-described image processing device.

Figure 3:
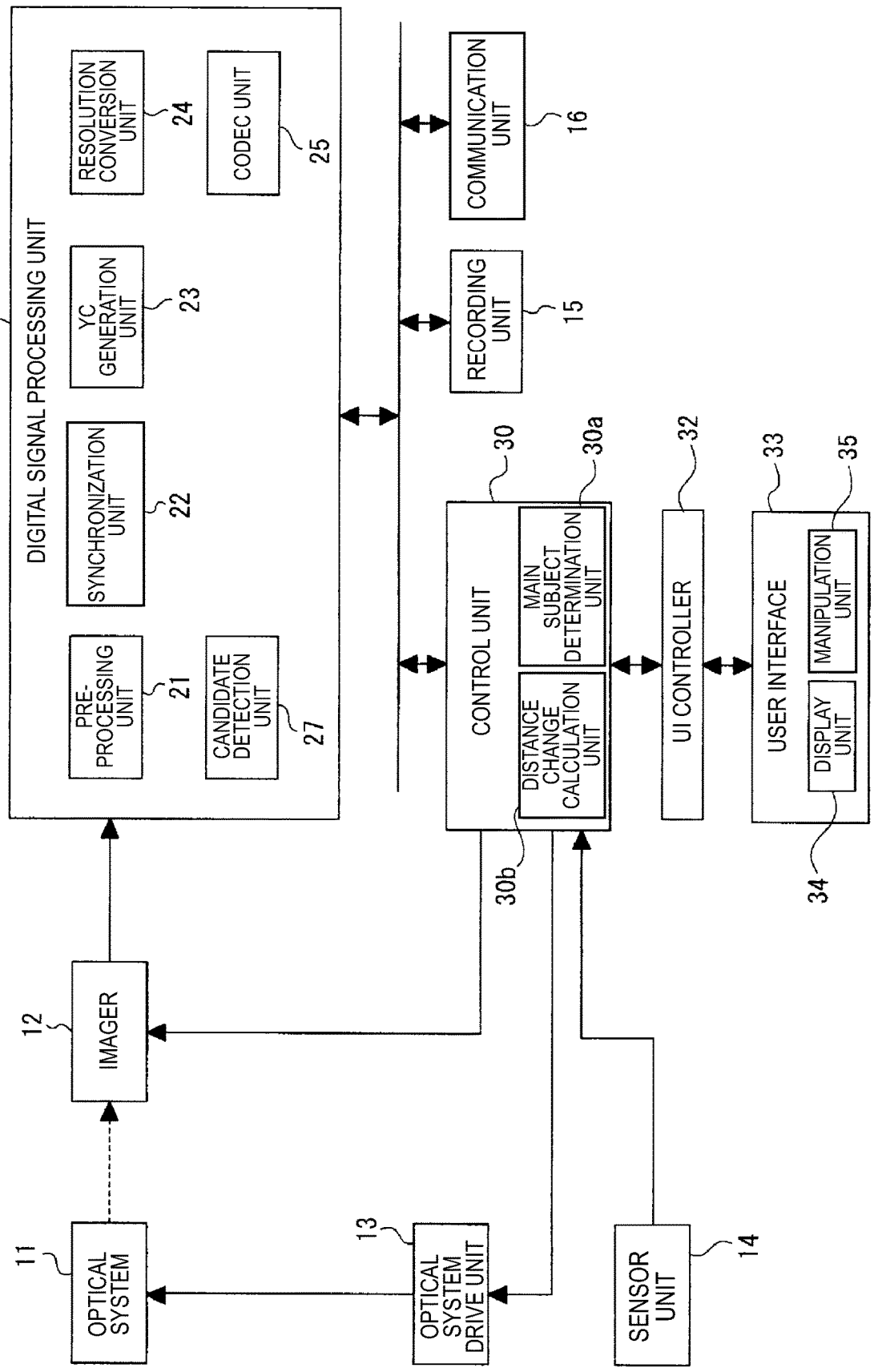
FIG. 3 is a block diagram of an imaging apparatus of a first embodiment.

A configuration example of the imaging apparatus 10 according to the embodiment is shown in FIG. 3. The configuration example of the imaging apparatus 10 is appropriate for a first embodiment. Configuration examples of the imaging apparatus 10 according to second to fourth embodiments will be described at each time.

The imaging apparatus 10 is considered as a so-called digital still camera or a so-called digital video camera and is an apparatus performing imaging or recording a still image or a moving image and including the image processing device described in the claims.

The imaging apparatus 10 shown in FIG. 3 has an optical system 11, an imager 12, an optical system drive unit 13, a sensor unit 14, a recording unit 15, a communication unit 16, a digital signal processing unit 20, a control unit 30, a user interface controller (hereinafter, "UI controller") 32, and a user interface 33.

The optical system 11 has lenses such as a cover lens, a zoom lens, and a focus lens and a throttle mechanism. By this optical system 11, light from a subject is collected in the imager 12.

The imager 12, for example, has a CCD (Charge Coupled Device) type or CMOS (Complementary Metal OxideSemiconductor) type image sensor.

The imager 12, for example, performs a CDS (Correlated Double Sampling) process, an AGC (Automatic Gain Control) process and the like for an electrical signal obtained through photoelectric conversion in the image sensor, and further performs an A-D (Analog-Digital) conversion process. Then, the imager 12 outputs an imaging signal as digital data to the digital signal processing unit 20 of a rear stage.

The optical system drive unit 13 drives the focus lens of the optical system 11 and performs a focus operation under the control of the control unit 30. Furthermore, the optical system drive unit 13 drives the throttle mechanism of the optical system 11 and performs exposure adjustment under the control of the control unit 30. Moreover, the optical system drive unit 13 drives the zoom lens of the optical system 11 and performs a zoom operation under the control of the control unit 30.

The digital signal processing unit 20, for example, is configured as an image processor by a DSP and the like. The digital signal processing unit 20 performs various types of signal processes for a digital signal (captured image signal) from the imager 12.

For example, the digital signal processing unit 20 includes a pre-processing unit 21, a synchronization unit 22, a YC generation unit 23, a resolution conversion unit 24, a codec unit 25, and a candidate detection unit 27.

The pre-processing unit 21 performs a clamping process of clamping a black level of R, G, and B to a predetermined level, or a correction process among color channels of R, G, and B with respect to the captured image signal from the imager 12.

The synchronization unit 22 performs a demosaicing process such that image data for each pixel has color components of all of R, G, and B.

The YC generation unit 23 generates (separates) a luminance (Y) signal and a color (C) signal from the image data of R, G, and B.

The resolution conversion unit 24 executes a resolution conversion process on the image data on which various types of signal processes have been performed.

The codec unit 25, for example, performs a coding process for recording or communication with respect to the image data for which the resolution conversion has been performed.

The candidate detection unit 27 performs an image analysis process in units of frames (or per intermittent frame) for a captured image signal (luminance signal and color signal) obtained by, for example, the YC generation unit 23, and then extracts a candidate image. In other words, face image detection, human body detection, and the like are performed for image data continuously input on a time axis, and then images serving as candidates for a main subject are extracted.

Note that face detection, human body detection, and the like can be performed using techniques of pattern matching and the like in image analysis performed with respect to captured image data, but if only a dictionary used in pattern matching is replaced, other detectors can also be realized in principle. For example, extraction of candidate images of a main subject for dog detection (of a certain breed), cat detection, and the like is possible.

In addition, for example, detecting a moving body and setting the moving body to be a candidate image using a technique of moving body detection based on a frame difference can also be considered, and a technique of extracting an area of interest that is called saliency (Saliency) may be used.

Various techniques of extracting and selecting candidate images are considered.

The candidate detection unit 27, for example, a face image is detected, and an area in which the face image is present is extracted as a candidate image frame.

With regard to the extracted candidate image, position information of the candidate image frame (x and y coordinate values on a screen, information of a subject distance, and the like) or size information (for example, the width, height, and number of pixels of the candidate image frame, and the like) are transferred to the control unit 30 as candidate image information. Note that, here, since the candidate image information is information indicating a frame of an image area serving as a candidate image, the term of candidate image information is also referred to as "candidate image frame information."

In addition, the candidate detection unit 27 may perform a smoothing process, an outlier (outlier) removal process, or the like for the image to generate candidate image frame information.

A functional configuration in which the candidate detection unit 27 is implemented in the digital signal processing unit 20 is set in the example of FIG. 3, but this is an example, and the control unit 30 may execute the process of the candidate detection unit 27.

The control unit 30 is configured by a micro-computer (arithmetic processing device) that has a CPU, a ROM (Read Only Memory), a RAM (Random Access Memory), a flash memory, and the like.

By executing a program stored in the ROM, the flash memory, and the like, the CPU comprehensively controls the entire imaging apparatus 10.

The RAM serving as a work area when the CPU performs various kinds of data processes is used for temporarily storing data, programs, and the like.

The ROM and the flash memory (non-volatile memory) are used for storing an OS (Operating System) necessary for control of each unit by the CPU, content files such as image files, application programs for various operations, firmware, and the like. For example, programs for executing the main subject determination process that will be described later in the present example, and further application programs that use main subject determination results, and the like are stored therein.

The control unit 30 described above controls operations of necessary units relating to instruction of various signal processes in the digital signal processing unit 20, imaging operations and recording operations according to a user manipulation, a reproducing operation of recorded image files, camera operations such as zooming, focusing, and exposure adjustment, user interface operations, and the like.

In the case of the embodiment, the control unit 30 has the functions of a main subject determination unit 30a and a distance change calculation unit 30b and performs approach determination (or recession determination) and the main subject determination process described in the first to fourth embodiments to be described below.

In the case of the configuration in FIG. 3, the distance change calculation unit 30b calculates the image size of the candidate image set in the candidate detection unit 27, calculates a change in the image size at each unit time, and determines the tendency toward approach or the recession from the calculation result.

The main subject determination unit 30a performs a process of setting the main subject in the candidate image based on the determination result of the distance change calculation unit 30b.

The user interface 33 executes display output and audio output to a user, and receives input of a user manipulation. For this reason, the user interface has a display device, a manipulation device, a speaker device, a microphone device, and the like. Herein, a display unit 34 and a manipulation unit 35 are shown.

The display unit 34 is a display unit that performs various types of display for a user (a photographer and the like), and for example, is formed using a display device, such as an LCD (Liquid Crystal Display) or an organic EL (Electro-Luminescence) display, which is formed on a housing of the imaging apparatus 10. In addition, the display unit may be formed using the LCD or the organic EL display in a so-called view finder form.

This display unit 34 includes the display device and a display driver that allows the display device to perform display. The display driver allows various types of display to be performed on the display device based on the instruction of the control unit 30. For example, the display driver reproduces and displays a still image or a dynamic image captured and recorded in a recording medium, or displays a through image (subject monitoring image) as a dynamic image based on captured image data of each frame, which is captured during release (a shutter manipulation) standby, on a screen of the display device. Furthermore, the display driver allows various manipulation menus, icons, messages and the like, that is, a GUI (Graphical User Interface), to be displayed on the screen. In the case of the present embodiment, for example, display that helps the user to ascertain a determination result obtained from main subject determination on the through image or reproduced image is also performed.

The manipulation unit 35 has an input function of receiving a user manipulation, and sends a signal corresponding to the input manipulation to the control unit 30.

The manipulation unit 35, for example, is realized by various manipulators provided on the housing of the imaging apparatus 10, a touch panel formed on the display unit 34, and the like.

As the manipulator on the housing, a reproduction menu start button, a decision button, an arrow key, a cancellation button, a zoom key, a slide key, a shutter button (a release button) and the like are provided.

Furthermore, by a touch panel manipulation using the icons and menus displayed on the touch panel and the display unit 34, various kinds of manipulation may be possible.

An operation of the display unit 34 of the user interface 33 and the like is controlled by the UI controller 32 according to instructions of the control unit 30. In addition, information of manipulation by the manipulation unit 35 is transmitted to the control unit 30 by the UI controller 32.

The recording unit 15 includes, for example, a nonvolatile memory, and serves as a storage area for storing image files (content files) such as still image data or dynamic image data, attribute information of the image files, thumbnail images and the like.

The image files are stored in the form of, for example, a JPEG (Joint Photographic Experts Group), a TIFF (Tagged Image File Format), a GIF (Graphics Interchange Format) and the like.

The actual form of the recording unit 15 can be variously considered. For example, the recording unit 15 may be a flash memory that is embedded in the imaging apparatus 10, or may have a form based on a memory card (for example, a portable flash memory) attachable to and detachable from the imaging apparatus 10 and a card recording and reproduction unit that performs recording and reproduction access to the memory card. Furthermore, the recording unit may be realized in the form of an HDD (Hard Disk Drive) and the like that is embedded in the imaging apparatus 10.

Furthermore, in the present example, a program for performing approach determination (or recession determination) and the main subject determination process that will be described later may be stored in the recording unit 15.

The communication unit 16 performs data communication or network communication with an external device in a wired or wireless manner.

For example, the communication unit performs communication of the captured image data (still image files or dynamic image files) with an external display apparatus, a recording apparatus, a reproduction apparatus and the like.

Furthermore, as a network communication unit, the communication unit may perform communication through various networks, for example, the Internet, a home network, or a LAN (Local Area Network), or perform various types of data transmission and reception with a server, a terminal and the like on the network.

The sensor unit 14 comprehensively represents various sensors. For example, a gyro sensor (angular velocity sensor), an acceleration sensor, and the like for detecting overall motions of the imaging apparatus 10 such as camera shake, attitudes and movements (panning movement, tilting movement, and the like) of the imaging apparatus 10 are provided.

In addition, a luminance sensor that detects external luminance for exposure adjustment and the like and a distance measuring sensor that measures subject distances may be provided.

In addition, there are cases in which a zoom lens position sensor that detects positions of the zoom lens in the optical system 11 and a focus lens position sensor that detects positions of the focus lens are provided as the sensor unit 14.

In addition, there are cases in which a sensor that detects opening amounts of a mechanical iris (diaphragm mechanism) is provided as the sensor unit 14.

The various sensors of the sensor unit 14 each transmit detected information to the control unit 30. The control unit 30 can perform various kinds of control using the information detected by the sensor unit 14.

In the imaging apparatus 10, the configuration portion of the image processing device 1 described in FIG. 1 is as follows.

The configuration of the image processing device 1 in FIG. 1 corresponding to the main subject determination unit 2 is implemented as the main subject determination unit 30*a* in the control unit 30 of the imaging apparatus 10 by software. The configuration corresponding to the subject distance change determination unit 3 is implemented as the distance change calculation unit 30*b* in the candidate detection unit 27 and the control unit 30 of the imaging apparatus 10 by software.

The control unit 30 controls the execution of an operation as an image processing method described in the claims by executing a process based on a program described in the claims.

3. Opportunity and Objective of Main Subject Determination, Etc.

In the present embodiment, main subject determination is performed as described in the first to the fourth embodiments to be described later, and an opportunity, objective, etc. for performing main subject determination in the imaging apparatus 10 will be described.

First, an example of using a main subject determination result will be described.

Main subject determination is executed when, for example, a user (photographer) aims at a shutter timing (release timing), but the control unit 30 can perform the following process after a main subject is automatically determined.

Tracking Process

A main subject set in each captured frame is tracked. For example, a main subject is specified on a through image display for the user, and provided for adjusting an angle of view performed by the user (for example, for decision of a subject in a state in which a camera is held in a hand).

Note that, as presentation of a main subject, highlight display of the frame of the main subject on the through image display by the display unit 34 is considered. In addition, the highlight display or the like may be performed for a given period immediately after the determination, or may be performed as long as the main subject is present within the through image.

Focusing

Auto focus is controlled for a main subject. In addition, in accordance with the tracking process, focus is adjusted tracking the main subject even when the main subject moves around.

Exposure Adjustment

Automatic exposure adjustment is performed based on brightness (luminance) of a main subject.

Directivity Adjustment

When sound collection is performed using a microphone together with capturing (for example, dynamic image capturing), directivity adjustment is performed according to a direction of a main subject within a field of view.

Zoom Control

Auto zoom is controlled with respect to a main subject. For example, the zoom lens is automatically driven so that the main subject is projected in a captured image in a predetermined size or greater at all times. Together with the tracking process, an angle of view may be set to be adjusted using zoom according to a change in a distance to the main subject.

Recording Start Control

Main subject determination may be set to trigger a start of dynamic image capturing. For example, dynamic image capturing and recording are started according to decision of a main subject.

In addition, a main subject can also be used in various signal processes performed with respect to a captured image signal.

Image Effect Process

Image processes including image quality adjustment, noise reduction, skin color adjustment, and the like are performed only on the area of a main subject in each captured frame.

Alternatively, adding an image effect, for example, a mosaicing process, an airbrushing process, a paint-out process, or the like in an area other than the area of the main subject is also considered.

Image Editing Process

An editing process such as framing, cropping, or the like is performed on a captured image or a recorded image.

For example, a process of cropping, enlarging, or the like of a partial area within a frame in which a main subject is included can be performed.

In addition, cutting of image peripheral portions of captured image data or the like can be performed so that a main subject is disposed at the center of the image, and composition adjustment can be performed.

These are merely examples, and various processes of application programs or automatic adjustment functions included in the imaging apparatus to use a set main subject are considered in addition to them.

Next, at what point of time the main subject determination process should be executed is also variously considered.

For example, whenever the imaging apparatus 10 is turned on to perform imaging (a period in which the display unit 34 displays a through image), the main subject determination process may be performed.

In addition, when a main subject is determined and then the tracking process is performed, the main subject determination process may be performed again at the time when the tracking is lost.

In addition, the main subject determination process may be set to start through user manipulation.

In addition, the process may be executed whenever a user selects a determination execution mode, or tracking is lost.

In addition, automatically activating the main subject determination process regardless of user manipulation may also be considered.

The following effects are achieved by performing the main subject determination process.

As previously described, it is naturally difficult to perform a manipulation of designating a main subject when a photographer aims at the subject holding the imaging apparatus 10.

Particularly, when an imaging direction is continuously changed in a fixed direction as in panning and tilting, or when an imaging direction is changed not in a fixed direction, the manipulation of designating a main subject is difficult.

In addition, the action of designating a main subject many times is bothersome.

If main subject determination is set to be automatically performed, such troubles are overcome, and the effect of reduced stress on the user is obtained.

In addition, the imaging apparatus 10 that is carried and used by a user, such as a digital still camera, a camera included in a mobile telephone, or the like used by general users, has the display unit 34 of a small size, and thus it is difficult for the user to perform an accurate manipulation of designating a main subject on a screen. The problem of erroneous designation is resolved by performing automatic determination as described in the present embodiment.

In addition, if the imaging apparatus 10 is set to automatically perform main subject determination, a user executes the main subject determination in a situation in which he or she holds the imaging apparatus 10 to aim at a subject, or changes an imaging direction to track the subject, and thus effects of enhancement of a feeling of intelligence of the apparatus that the user senses from the apparatus and enhancement of added value are obtained.

In addition, since the user can use the imaging apparatus 10 with a feeling of being able to image a main figure only by naturally holding the apparatus, imaging opportunities and use cases associated therewith can increase, and accordingly, a user-friendly camera can be provided to the user.

Based on the above points, as a camera of hand-held type, the imaging apparatus 10 of the present embodiment that automatically performs main subject determination is particularly preferred.

4. First Embodiment of Imaging Apparatus

In the first embodiment, a main subject determination process in the imaging apparatus having the above-described configuration in FIG. 3 will be described. This embodiment is an example in which the main subject determination is performed with the idea of the size determination scheme described in FIG. 2B. The first embodiment is assumed to be an example in which an approaching subject is determined to be the main subject.

Figure 4:
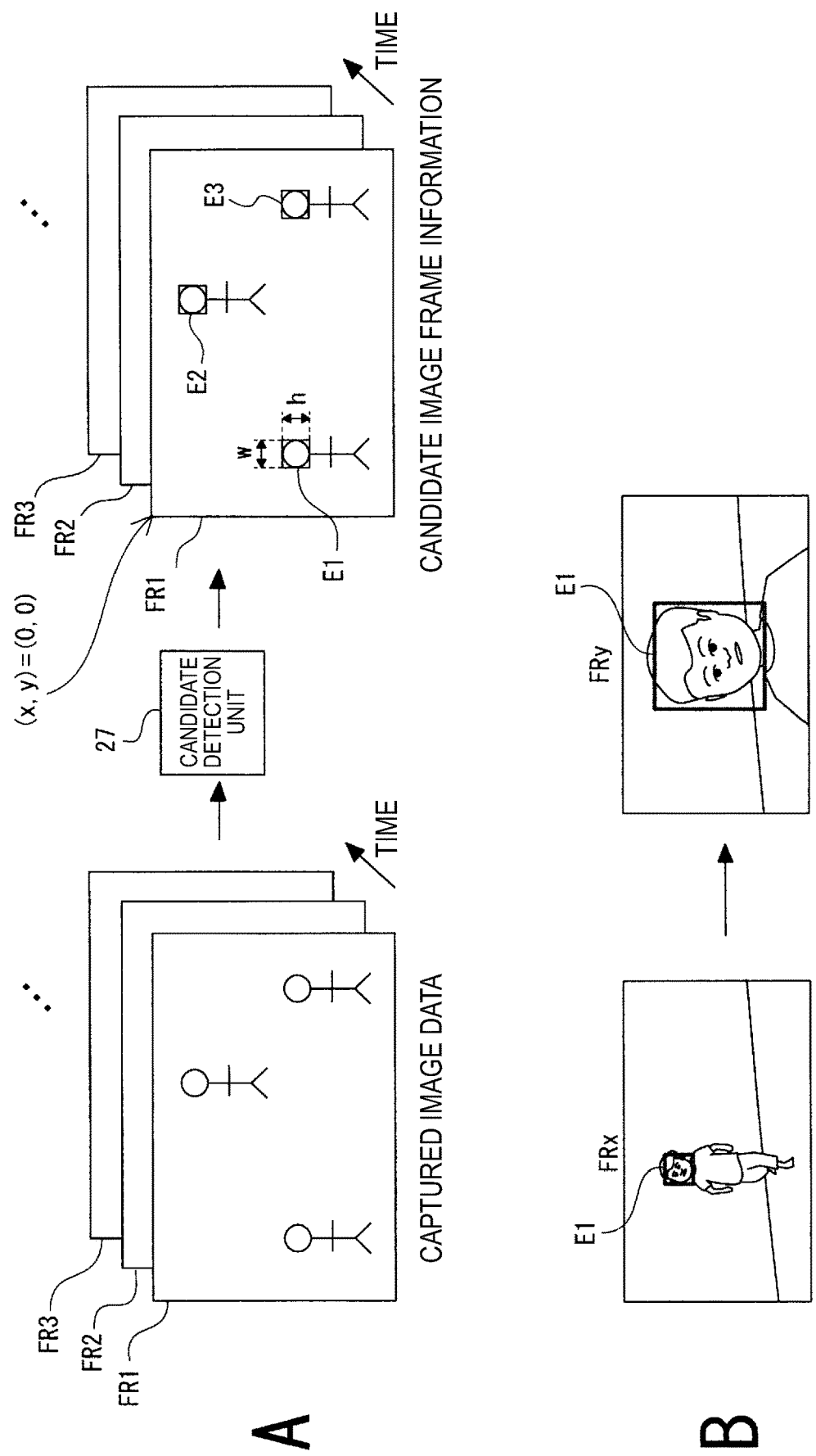
FIG. 4 is an explanatory diagram of the overview of main subject determination of the first embodiment.

FIG. 4A schematically shows a candidate image frame extraction operation performed by the candidate detection unit 27.

FIG. 4A shows frames FR1, FR2, FR3, . . . of captured image signals input to the digital signal processing unit 20 through an operation of the optical system 11 and the imager 12 of the imaging apparatus 10. The candidate detection unit 27 performs detection of candidate images from the continuous frames (or intermittent frames) sequentially input as above.

For example, as shown in the drawing, when three people are present in the frame FR1, portions of face image portions are extracted as candidate images and candidate image frame information of candidate image frames E1, E2, and E3 is output. For example, the candidate image frame information of the candidate image frame E1 is, for example, position information (x, y position information) in an image of the candidate image frame E1 and the width w and the height h of the candidate image frame. The x,y position information is, for example, coordinate values with the origin (0, 0) in the upper left corner of an image. The width w and the height h may be, for example, the number of pixels. The candidate detection unit 27 generates such candidate image frame information of the candidate image frames E2 and E3, and then transmits or receives the candidate image frame information to or from the control unit 30.

In the same manner, the candidate detection unit 27 extracts candidate images of the following frames FR2, FR3, . . . , generates candidate image frame information for each of candidate image frames of the images, and then transfers the information to the control unit 30.

The control unit 30 calculates a frame area (h×w) as the size of each candidate image frame whenever the candidate image frame information for each frame is taken, and further detects a difference from the size of this candidate image of a previous frame as a change amount of the frame area. Then, the control unit 30 determines whether each candidate image has the tendency toward approach by observing a change in the difference on a time axis.

For example, FIG. 4B shows an example of a captured image when a subject person considered to be the candidate image frame E1 is approaching in the direction of the imaging apparatus 1. In a certain frame FRx, the frame area of the candidate image frame E1 is relatively small. However, in a frame FRy at a time point at which some time has passed, the frame area of the candidate image frame E1 increases. Whether the subject is approaching is determined by observing the change in the size of the candidate image frame.

FIG. 5A shows a change in the calculated frame area when the candidate image frames E1, E2, and E3 are assumed to be continuously present in the frames (FR1, FR2, . . . ) during a certain period.

For example, a case in which the photographer catches subjects of three people with the imaging apparatus 10 during a certain period is assumed. When each of the three people is moving or the photographer is moving carrying the imaging apparatus 10, frame area distances of the calculated candidate image frames E1, E2, and E3 are changed on the time axis. In this example, the frame area of the candidate image frame E1 gradually increases. However, the frame areas of the candidate image frames E2 and E3 are slightly changed, but are not considerably changed on average.

FIG. 5B shows a transition of the change amounts of the frame areas of the candidate image frames E1, E2, and E3. For example, a value at each time point is shown as a difference obtained by subtracting the frame area of a previous frame from the frame area of a current frame. Accordingly, when a relative distance to the imaging apparatus 10 becomes closer than at the previous time point, the value of the area change amount increases. When the relative distance is not changed, the area change amount is 0. When the subject recedes, the area change amount is a negative value.

Accordingly, a determination result of each area change amount is first obtained using a distance determination threshold value Thd for determining whether the subject is approaching based on the area change amount. When the area change amount exceeds the distance determination threshold value Thd, the subject is determined to approach by a distance equal to or greater than a predetermined distance at this time point.

FIG. 5C shows the determination results of the candidate image frames E1, E2, and E3. When the area change amount exceeds the distance determination threshold value Thd, a flag of an "H" level is set.

As understood from the drawing, the value of the area change amount is normally a high value and an E1 determination result is continuously set to "1" in the candidate image frame E1.

In the candidate image frame E2, an E2 determination result is set to "1" during only a certain period since the value of the area change amount is a high value in some cases.

In the candidate image frame E3, an E3 determination result is continuously set to "0" since the value of the area change amount is normally a low value.

In this example, the subject that is approaching on average, cumulatively, or continuously for some time is determined to be a subject with the tendency toward approach. The subject for which the period in which the determination result in FIG. 5C is "1" is long is determined to be a subject with the tendency toward approach. For example, when a period length of a continuous period, a cumulative period, or the like in which the determination result is "1" is counted, the tendency toward approach can be determined.

For example, the candidate image frame E1 can be determined to have the tendency toward approach during this determination period since the determination result is "1" and the period is long.

The candidate image frame E2 can be said to be, for example, a subject temporarily approaching or receding. The candidate image frame E3 is a subject remaining at a relative distant position.

A period from determination start to determination end differs according to a specific process example. In a process example of FIG. 6 to be described below, when a period length for which the determination result is "1" is counted and the period length reaches a predetermined time, the candidate image frame is determined to have the tendency toward approach. In this case, for example, when there is a subject for which the determination result is normally "1" as in the candidate image frame E1, a timing of the determination end is quickened. That is, the determination period length changes depending on a situation of the determination process. As another example, the period from the determination start to the determination end is set as a fixed period length.

A specific example of the approach determination and the main subject determination process by the control unit 30 will be described with reference to FIG. 6. A process to be described below is a process performed by the functions of the distance change calculation unit 30b and the main subject determination unit 30a of the control unit 30.

When the control unit 30 starts the approach determination and the main subject determination process, first, the variable TSF=0 is set as initial setting in Step F100 and a count value Cnt(n)=0 is set.

The variable TSF is a flag indicating whether the setting of the main subject ends. TSF="0" indicates a non-determination state of the main subject.

The count value Cnt(n) is the value of a counter for determining a time length in regard to a determination result obtained by comparing the above-described area change amount and the distance determination threshold value Thd.

Note that "n" indicates natural numbers of 1, 2, 3 . . . and the count value Cnt (n) is set to be a count value corresponding to each detected candidate image frame E (n) like the candidate image frames E1, E2, and E3. When the three candidate image frames E1, E2, and E3 are detected, Cnt1, Cnt2, and Cnt3 are used as count values. For the sake of description of the flowchart, it is advised that a process with regard to the count value Cnt(n) be understood as, for example, a process targeting each of Cnt1, Cnt2, and Cnt3.

Figure 6:
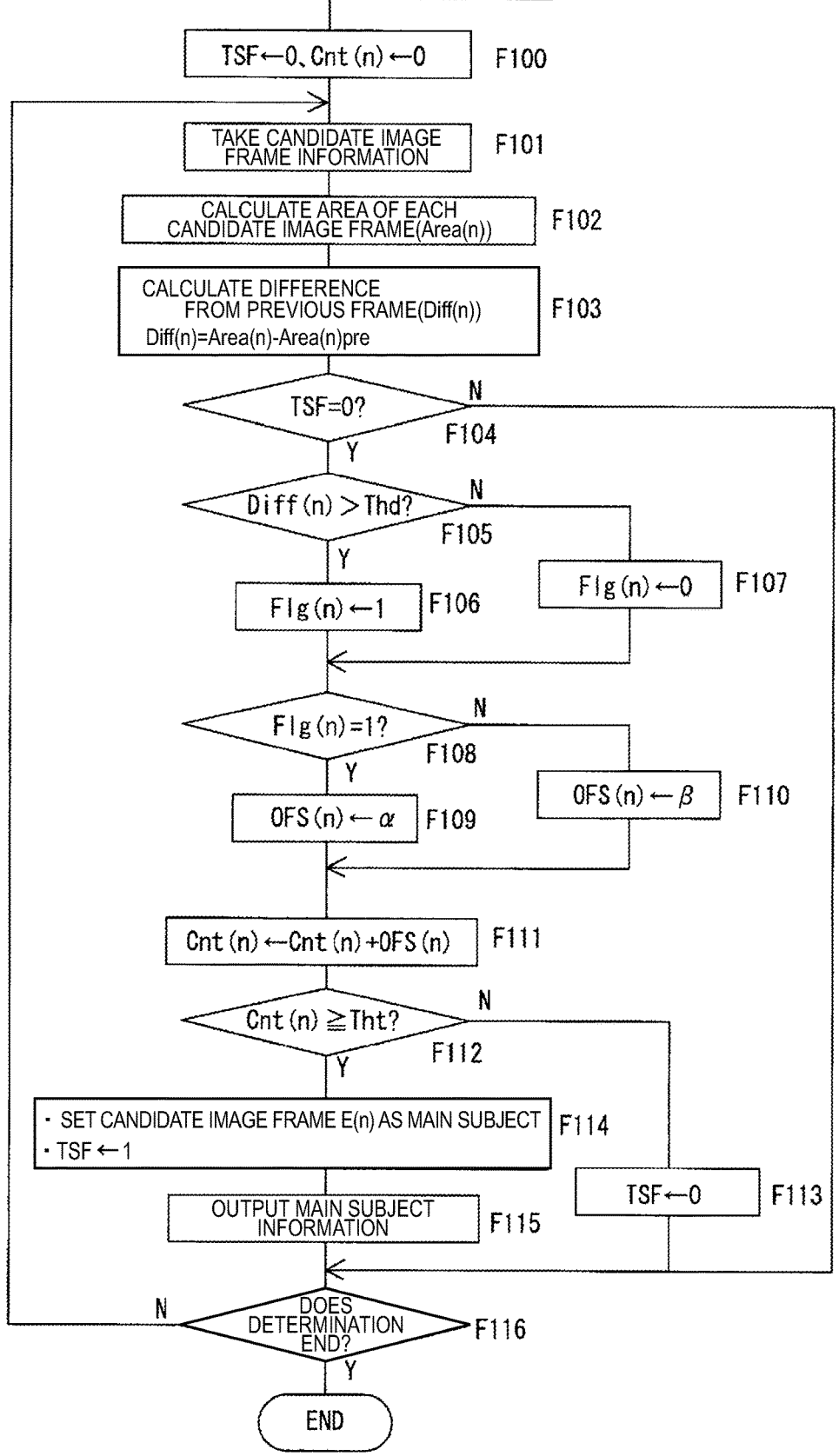
FIG. 6 is a flowchart of the approach determination and a main subject determination process of the first embodiment.

A frame area Area(n) to be described in FIG. 6 also similarly indicates a frame area of each candidate image frame. A process for the frame area Area(n) is used to mean a process on each of frame areas Area1, Area2, Area3, . . . of the candidate image frames E1, E2, and E3, . . . , for example.

Further, an area change amount Diff(n) similarly indicates an area change amount of each candidate image frame. The process for the area change amount Diff(n) is used to mean a process on each of area change amounts Diff1, Diff2, Diff3, . . . of the candidate image frames E1, E2, and E3, . . . , for example.

The same also applies to a determination flag Flg(n) and an offset value OFS(n).

In addition, a candidate image frame E(n) indicates each of the candidate image frames E1, E2, E3 . . . , but it is preferably distinguished for each subject over a plurality of frames. In an example in which the candidate detection unit 27 extracts a face, when a person A, a person B, and a person C are subjects, for example, the face image portion of the person A is set to be the candidate image frame E1, the face image portion of the person B to be the candidate image frame E2, and the face image portion of the person C to be the candidate image frame E3 common in each of the frames. If only a person D is interposed as a subject in a certain middle frame, the face image portion of the person D is set to be a candidate image frame E4. Thus, it is better for the candidate detection unit 27 to not only merely detect a "face" but also determine an entity (individual).

For example, the control unit 30 performs the processes of Steps F101 to F116 at a timing of every one frame.

In Step F101, the control unit 30 takes candidate image frame information of a certain frame from the candidate detection unit 27. For example, with regard to each candidate image frame E(n), information including an x value and a y value of two-dimensional (x-y) coordinate values of image data as position information, and a width w and a height h of the candidate image frame as size information are acquired.

In Step F102, the control unit 30 calculates the frame area Area(n) of each frame image frame E(n). The frame area Area(n)=width w×height h is obtained. Here, the frame is assumed to be square. However, the candidate image frame E(n) may not necessarily be square, but can also be considered to be circular, elliptical, or amorphous. In this case, the frame area Area(n) may be assumed to be the number of pixels contained in the candidate image frame E(n).

Next, in Step F103, the control unit 30 obtains an area change amount Diff(n) of each candidate image frame E(n). The area change amount Diff(n) is obtained as a difference from a previous frame. That is, "area change amount Diff(n)=Area(n)−Area(n)pre" is obtained. Area(n)pre is a frame area Area(n) of the previous frame of the candidate image frame E(n). For example, the frame area Area(n) obtained in Step F102 when an image one frame before is a target is considered to be "Area(n)pre" at a process time point of the current frame.

In Step F104, the control unit 30 confirms a variable TSF. When the variable TSF=0 is set, the process proceeds to Step F105.

For example, during a period in which the main subject determination is performed and the main subject determination process is not necessary due to operation mode setting or the like, the variable TSF=1 is set, and thus the main subject determination process is not performed.

For example, when the main subject determination process of FIG. 6 is configured to be performed as necessary through a user's manipulation or automatic activation determination, the process of Step F104 may be unnecessary.

In Steps F105, F106, and F107, the control unit 30 confirms whether the area change amount Diff(n) of each candidate image frame E(n) indicates approach.

That is, whether the area change amount Diff(n) is a change amount indicating the approach of a predetermined amount or more is determined using the distance determination threshold value Thd described in FIG. 5B.

Therefore, in Step F105, the control unit 30 compares the area change amount Diff(n) of each candidate image frame E(n) to the distance determination threshold value Thd. When "Diff(n)>Thd" is satisfied, the determination flag Flg(n)=1 (approaching) is set in Step F106. When "Diff(n)>Thd" is not satisfied, the determination flag Flg(n)=0 (not approaching) is set in Step F107.

The determination flag Flg(n) corresponds to the determination result of "1" or "0" described in FIG. 5C.

Subsequently, in Steps F108, F109, and F110, the control unit 30 sets the offset value OFS(n) for a counting process depending on whether the determination flag Flg(n) is "1" or "0."

For example, the control unit 30 sets the offset value OFS(n)=α in Step F109 when the determination flag Flg(n)=1 is set. Here, α is a predetermined value for incrementing the counter. For example, α=1 is set.

The control unit 30 sets the offset value OFS(n)=β in Step F110 when the determination flag Flg(n)=0 is set. Here, β is a predetermined value for keeping a count value or decrementing a count value. When the count value is kept, β=0 is set. When the counter is decremented, for example, β=−1 is set.

Then, in Step F111, the control unit 30 performs a process of the count value CNT(n) of the counter counting a time length in which approach is observed. Specifically, CNT(n)=CNT(n)+OFS(n) is set.

When α=1 is considered and the offset value OFS(n) is set in the foregoing Step F109, the count value CNT(n) is incremented.

When β=0 (or β=−1) is considered and the offset value OFS(n) is set in Step F110, the count value CNT(n) is kept (or is decremented).

The count value CNT(n) is incremented when the approach is detected. Therefore, when the subject of the candidate image frame E(n) is approaching, the count value becomes a value corresponding to the length of the detected period. When the approach is not detected (for example, a situation in which a subject person stops) and the count value CNT(n) is configured to be kept, the count value CNT(n) is a cumulative value of the approach detection and thus increases according to the approach despite the fact that the subject person stops. When the approach is not detected and the count value CNT(n) is configured to be decremented, the count value CNT(n) increases according to the average approach. However, when the approach is not detected, the count value decreases. Thus, when the subject temporarily stops or recedes, subsequent determination of the tendency toward approach may be disadvantageous.

Then, in Step F112, the control unit 30 determines whether each candidate image frame E(n) has the tendency toward approach. Specifically, the control unit 30 determines whether the count value CNT(n) indicating the time length of the approach detection becomes a value equal to or greater than a predetermined time threshold value Tht.

When none of the count values Cnt(n) of the candidate image frames E(n) reaches the time threshold value Tht, the variable TSF=0 remains in Step F113, the end of the determination is not determined in Step F116, and the process returns to Step F101. In this case, the process after Step F101 is performed, as described above, based on the candidate image frame information input for a subsequent frame.

In Step F116, when the variable TSF=0 is set, the main subject determination is assumed not to be completed and the determination process continues. When the variable TSF=1 is set, the main subject determination is assumed to be completed. When the variable TSF=1 is detected in the above-described Step F104, the determination ends directly.

Although the detailed description is omitted, for example, the user may be allowed to select the main subject through a manipulation of touching the main subject on the screen of the display unit 34 or a manipulation of half pressing the shutter button according to a predetermined position of a subject on the screen, in parallel to the automatic main subject determination of this example. When the user performs such a designation manipulation during the execution of the process of FIG. 6, it is desirable to prefer the user's manipulation. Thus, when the main subject setting is performed through such a manual manipulation, the variable TSF=1 is set. In this case, the process of FIG. 6 may end (interruption end) through the determination of Steps F104 and F116.

The main subject determination performed through the approach determination is performed during a certain time length. Therefore, when the process is not performed on the candidate image frame information for some time (the number of frames), the determination does not end in Step F116, as described above, the process returns to Step F101, and the process is repeated.

Figure 5:
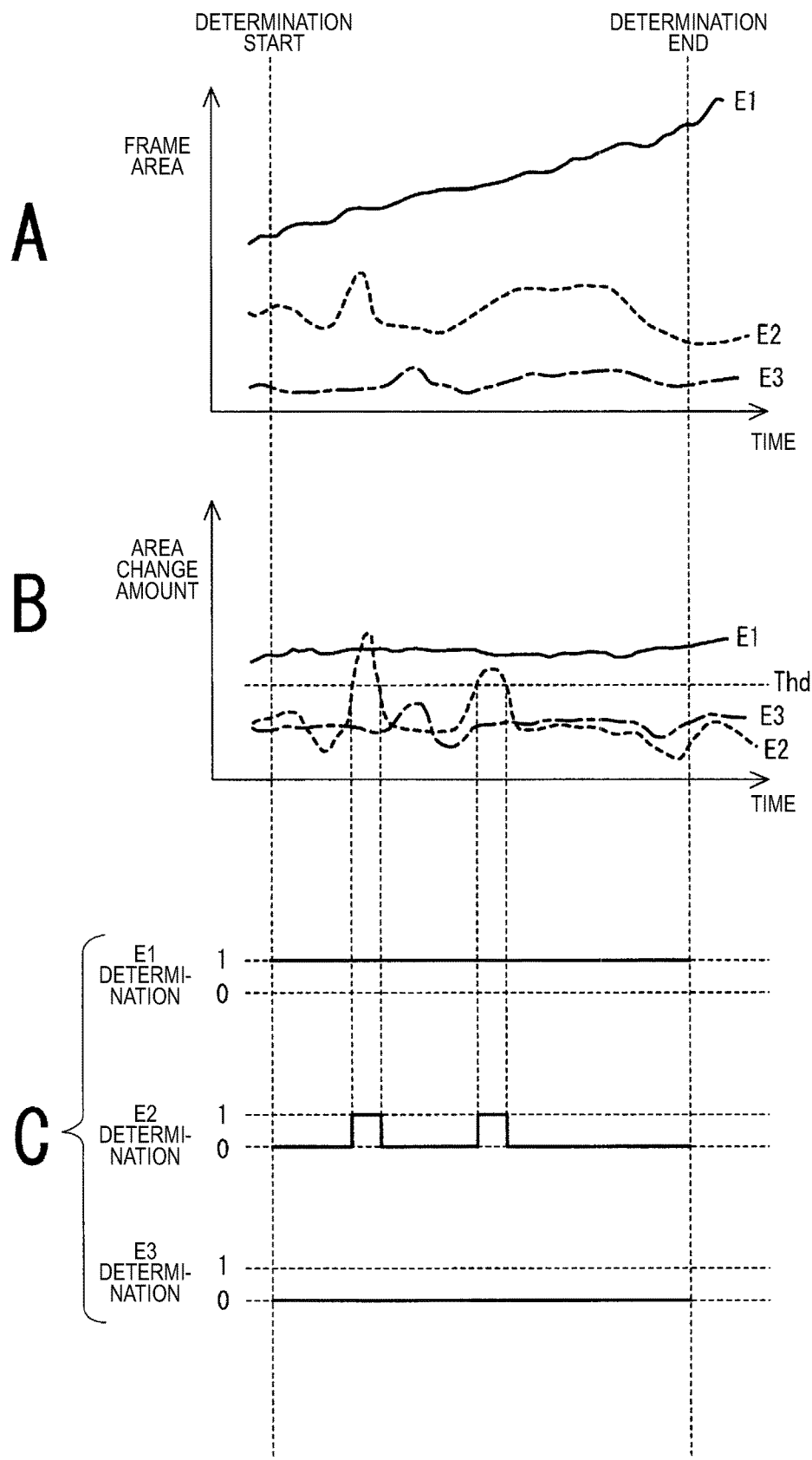
FIG. 5 is an explanatory diagram of approach determination of the first embodiment.

Here, for example, as shown in FIG. 5, the certain candidate image frame E1 may be discontinuous, but there is a situation in which the approach is detected in a plurality of frames. Then, there are many opportunities in which the count value Cnt1 of the candidate image frame E1 is incremented in Step F111 as time passes, and thus the count value Cnt1 advances earlier than the count values Cnt2 and Cnt3.

Then, at a certain time point, the count value Cnt1 first reaches the time threshold value Tht.

In this case, the control unit 30 causes the process to proceed from Step F112 to Step F114.

In Step F114, the control unit 30 determines that the candidate image frame E(n) for which the count value Cnt(n) reaches the time threshold value Tht is the main subject and performs the setting of the main subject. Then, the variable TSF=1 is set. That is, the subject of the candidate image approaching on average during a certain period is determined to be a subject having the "tendency toward approach" and is set as the main subject.

Then, in Step F115, the main subject information is output to be transmitted to or received from, for example, an application program or a control program using the main subject information.

In this case, the end of the determination is considered in Step F116. That is, for example, the candidate image frame E1 is set as the main subject, and thus the approach determination and the main subject determination process of FIG. 6 are completed.

In this process example, the process continues until the variable TSF=1 is set. However, actually, it is appropriate to provide a predetermined restriction time limit. That is, when the main subject may not be determined despite the fact that a predetermined time has passed from the process start time point of FIG. 6, the process is configured to end as a process in which there is no main subject.

The approach determination and the main subject determination process are performed, as described above.

In the approach determination and the main subject determination process, the tendency toward approach is determined in the plurality of frames among the extracted candidate images.

For example, a subject of high certainty at which a photographer holding a camera is considered to aim as a target has the tendency toward approach in many cases. For example, when a camera is oriented to a child, the child is observed to approach in many cases. Accordingly, when automatically setting an approaching subject as the main subject, the process is appropriate for the photographer, thereby considerably improving operability at the time of imaging. Even a user unaccustomed to an imaging manipulation can capture a still image or a moving image with high quality, for example, when focus control or exposure control is automatically performed on the main subject through the main subject determination.

Other various specific process examples can be considered as the approach determination and the main subject determination process.

For example, when $\beta=0$ is set in Step F110 of FIG. 6, the count value CNT(n) corresponds to a cumulative value of the number of times the approach detection is cumulatively performed.

When $\beta=-1$ is set in Step F110 of FIG. 6, the count value CNT(n) can be regarded as a value at which the approach detection is performed on average.

That is, in this case, the approach determination of Step F112 is the determination in which the subject is approaching cumulatively or on average.

On the other hand, when the subject is continuously approaching during a period equal to or greater than a predetermined period, the subject may be determined to have the tendency toward approach. For such occasions, the count value CNT(n) is incremented when the determination flag Flg(n)=1 is considered in Step F108, and the count value CNT(n) may be reset to zero when the determination flag Flg(n)=0 is considered in Step F108. Then, when the state of the determination flag Flg(n)=1 continuously reaches a predetermined time, the count value Cnt(n) reaches the time threshold value Tht in Step F112 and the candidate image frame E(n) is determined to have the "tendency toward approach" and the candidate image frame E(n) is determined to be the main subject.

According to the setting of the continuously approaching subject as the main subject with the tendency toward approach, for example, a stopping or temporarily receding subject can be prevented from being determined to be the main subject. Accordingly, this determination is appropriate for the main subject determination to be performed prudently. Conversely, when the determination of the main subject is desired to be performed in a short time or the main subject is desired to be set as easily as possible, the subject that is approaching on average or cumulatively is appropriately determined to have the tendency toward approach.

In the cases of the cumulative determination, the average determination, and the continuous determination described above, it is appropriate that specific determination values corresponding to the time threshold value Tht are different.

For example, when the approach is detected in the continuous, cumulative, or average sense under the predetermined time condition, the subject is determined to have the tendency toward approach, but weight of the determination may be changed temporarily.

For example, the values $\alpha$ and $\beta$ substituted into the offset value OFS(n) set in Steps F109 and F110 of FIG. 6 are changed with the progress of the process.

In general, when a photographer holds a camera, the photographer first does not particularly decide a subject set as a main figure in many cases. For example, the photographer holds the camera to search for an imaging target within a range of vision. In this case, when the photographer finds a gradually approaching person and attempts to photograph the person, the photographer performs an operation of gradually adjusting the person at the center in a subject direction. That is, there is a probability that the subject observed to approach in an image is thought to be a subject that the photographer desires to decide as the main subject as time passes. Accordingly, during the execution of the approach determination and the main subject determination process, the weight of the approach detection becomes stronger as time passes. Specifically, the value a substituted into the offset value OFS(n) in Step F109 increases step by step. By doing so, there is a high probability of the main subject determination conforming to the thought of the photographer being performed.

In the example of FIG. 6, at the time point at which the count value CNT(n) of the certain candidate image frame E(n) is equal to or greater than the time threshold value Tht, the main subject determination is performed and the determination ends, and thus the determination period is indefinite. On the other hand, a process example of setting a given determination period and setting, as the target of Step F114, the candidate image frame E(n) for which the count value CNT(n) is the largest or one or a plurality of candidate image frames E(n) for which the count value CNT(n) is equal to or greater than a predetermined value within the determination period to determine the candidate image frame to be the main subject can also be considered.

Another condition (AND condition) may be considered to be added to the determination of the tendency toward approach in order to determine a subject as the main subject. For example, the fact that a subject distance is less than a predetermined distance, the fact that a subject image has a size equal to or greater than a predetermined size, the fact that a type of image is specific, or the fact that the center of a subject image with the tendency toward approach is within a predetermined distance (a distance on the x and y coordinates) from the center point of a frame image may also be added to the condition.

By adding such conditions, it is possible to increase a probability of a subject that the photographer thinks to image more being determined to be the main subject as well as merely having the tendency toward approach. Accordingly, the user may be configured to select the additional conditions.

5. Second Embodiment of an Imaging Apparatus

A main subject determination process will be described according to the second embodiment. As in the first embodiment, this embodiment is an example in which an approaching subject is determined to be the main subject with the idea of the size determination scheme described in FIG. 2B.

Figure 7:
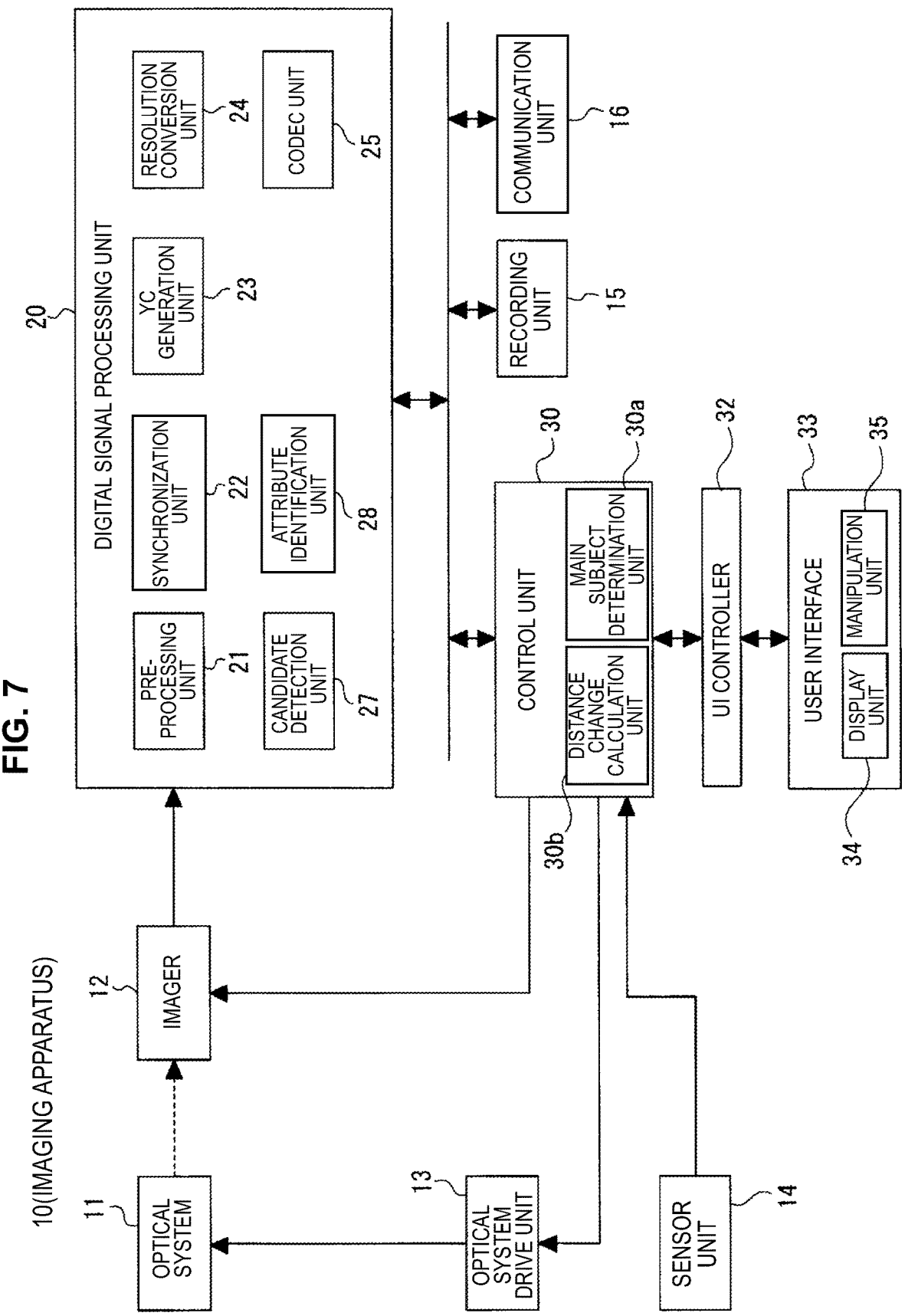
FIG. 7 is a block diagram of an imaging apparatus of a second embodiment.

In the case of the second embodiment, the configuration of an imaging apparatus 10 is shown in FIG. 7. In FIG. 7, the same reference numerals are given to the same portions as those of FIG. 3 and the description thereof will be omitted.

The imaging apparatus shown in FIG. 7 is different from that in FIG. 3 in that an attribute identification unit 28 is provided in the digital signal processing unit 20.

For example, the attribute identification unit 28 identifies an attribute of a subject that is detected as a candidate image through image analysis by the candidate detection unit 27, and then transmits or receives attribute information to or from the control unit 30. The attribute information is, for example, information indicating whether the subject detected as the candidate image is an adult or a child or information indicating whether the subject is a male or a female. For example, the attribute identification unit 28 discriminates characteristic points of a face image and determines gender or ages.

For example, the attribute identification unit 28 can be functionally configured to be performed by the digital signal processing unit 20. An example in which the attribute identification unit 28 is realized as a processing function in the control unit 30 can also be considered.

Figure 8:
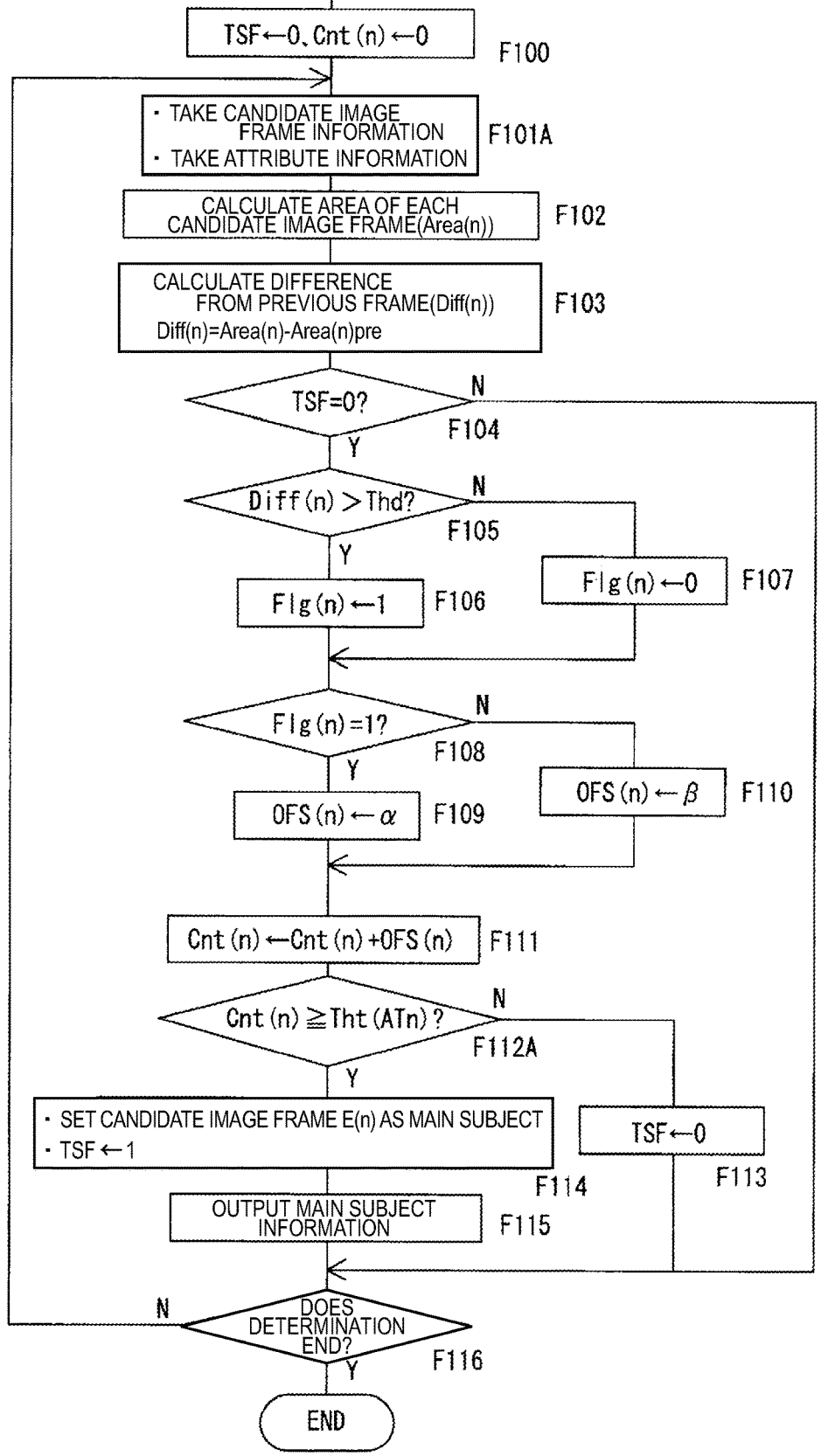
FIG. 8 is a flowchart of the approach determination and a main subject determination process of the second embodiment.

FIG. 8 shows a process example of the control unit 30 (a main subject determination unit 30a and a distance change calculation unit 30b). The same step numbers are given to the same processes of FIG. 6 described above and the repeated description will be omitted. Differences from FIG. 6 are processes of Steps F101A and F112A.

For example, the control unit 30 performs the processes of Steps F101 to F116 at a timing of every one frame. In Step F101A, the control unit 30 takes candidate image frame information of a certain frame from the candidate detection unit 27. For example, with regard to each candidate image frame E(n), information including an x value and a y value of two-dimensional (x-y) coordinate values of image data as position information, and a width w and a height h of the candidate image frame are acquired as position information. The control unit 30 further acquires attribute information AT(n) of each candidate image frame E(n) from the attribute identification unit 28. The attribute information is, for example, identification information for discriminating an adult from a child or for discriminating a male from a female. Specifically, when the candidate image frames E1, E2, and E3 are present, pieces of attribute information AT1, AT2, and AT3 are acquired. For example, the attribute information AT1 is information regarding "child and female," the attribute information AT2 is information regarding "adult and male," and the attribute information AT3 is information regarding "adult and female."

In Steps F102 to F111, a process of determining the tendency toward approach is performed on each candidate image frame E(n), as in FIG. 6.

In the case of FIG. 8, in Step F112, a time threshold value for determining a subject to have the tendency toward approach is assumed to be a time threshold value Tht(ATn) corresponding to the attribute information. The time threshold value Tht(ATn) means that a value serving as the time threshold value is switched according to the attribute information.

For example, the time threshold value Tht is set to a relatively small value in the cases of "child and female" and "child and male," is set to a relatively large value in the case of adult and female, and is set to a larger value in the case of "adult and male."

The control unit 30 may store threshold values according to the attribute information as table data in an internal storage unit or threshold values according to the attribute information may be decided by setting numeral values on a program. As a coefficient value in regard to a fixed threshold value Tht, a coefficient value may be set for each attribute. The control unit 30 may obtain the threshold value Tht(ATn) according to the attribute information in Step F112A.

In Step F112A, for each candidate image frame E(n), the count value CNT(n) is compared to the time threshold value Tht(ATn), and thus whether having the tendency toward approach or not is consequently determined. Then, the candidate image having the tendency toward approach is determined to be the main subject in Step F114.

According to the process example of FIG. 8, ease of determining the candidate image to be the main subject differs according to the attribute information. For example, when the time threshold value Tht (ATn) is a small value in the case of a child as described above, it is easy to determine the child to be the main subject. When the time threshold value Tht(ATn) is smaller in the case of a female than in the case of a male, it is easy to determine the female to be the main subject.

Thus, the ease of determining the candidate image to be the main subject or difficulty in determining the candidate image to be the main subject can be adjusted according to the attribute of the subject. Accordingly, it is easy to determine the candidate image desired by the user to be the main subject. For example, for a user mainly images a child, accuracy of the main subject determination is improved and the determination time is shortened by the above-described time threshold value.

In particular, the user may set a preference order according to various use cases. For example, when a child is imaged, setting is performed so that the child is preferred. When a male is imaged, setting is performed so that the male is preferred. Thus, when the user can select the time threshold value according to the attribute, the main subject determination is realized quickly and with high accuracy according to an imaging purpose of the user.

Various pieces of attribute information can be further considered. For example, attribute information obtained by estimating ages in greater detail than the attribute information of adult and child from an image and identifying age groups (child/youth/middle age/old age) may be used.

An example in which a personal face recognition scheme is introduced, children, family, and acquaintances of a user are determined, the time threshold value is lowered in this case, and such a candidate image is easily determined to be the main subject can also be considered. For example, the faces of the children, family, or the like of the user are registered in advance and characteristic data are obtained in advance. When the attribute identification unit 28 detects a face conforming to the characteristic data, attribute information is generated as information regarding a close relative and the control unit 30 sets the time threshold value Tht (ATn) to a small value in this case.

The attribute information is not limited to a person, but attribute information of an animal such as a dog or a cat or a type of animal may be generated and the time threshold value may be changed.

In the process of the second embodiment, the same modification examples as those of the first embodiment can be considered.

6. Third Embodiment of Imaging Apparatus

A main subject determination process will be described according to the third embodiment. As in the first embodiment, this embodiment is an example in which a receding subject is determined to be the main subject with the idea of the size determination scheme described in FIG. 2B.

As in FIGS. 5A, 5B, and 5C described above, FIGS. 9A, 9B, and 9C show the determination result using a change in the calculated frame area, an area change amount, and a distance determination threshold Thd when the candidate image frames E1, E2, and E3 are assumed to be continuously present in the frames (FR1, FR2, . . . ) during a certain period.

In the case shown in FIG. 9A, the frame area gradually decreases when the candidate image frame E1 is focused on. Here, unlike the definition of the area change amount described in FIG. 5B, that is, "(area change amount)=(frame area of current frame)−(frame area of previous frame)," the area change amount in FIG. 9B is defined as (area change amount)=(frame area of previous frame)−(frame area of current frame)." Then, the value of the area change amount is a large value when the frame area decreases. For example, the area change amount is shown in FIG. 9B according to the frame area change in FIG. 9A. When the area change amount is compared to the distance determination threshold value Thd and the determination is performed, the candidate image frames E1, E2, and E3 are shown in FIG. 9C.

In the case of this example, the determination result in the candidate image frame E1 is continuously "1."

In the candidate image frame E2, the determination result is "1" during a period in which the area change amount is a high value.

In the candidate image frame E3, the E3 determination result is continuously "0" since the area change amount is normally a low value.

Figure 9:
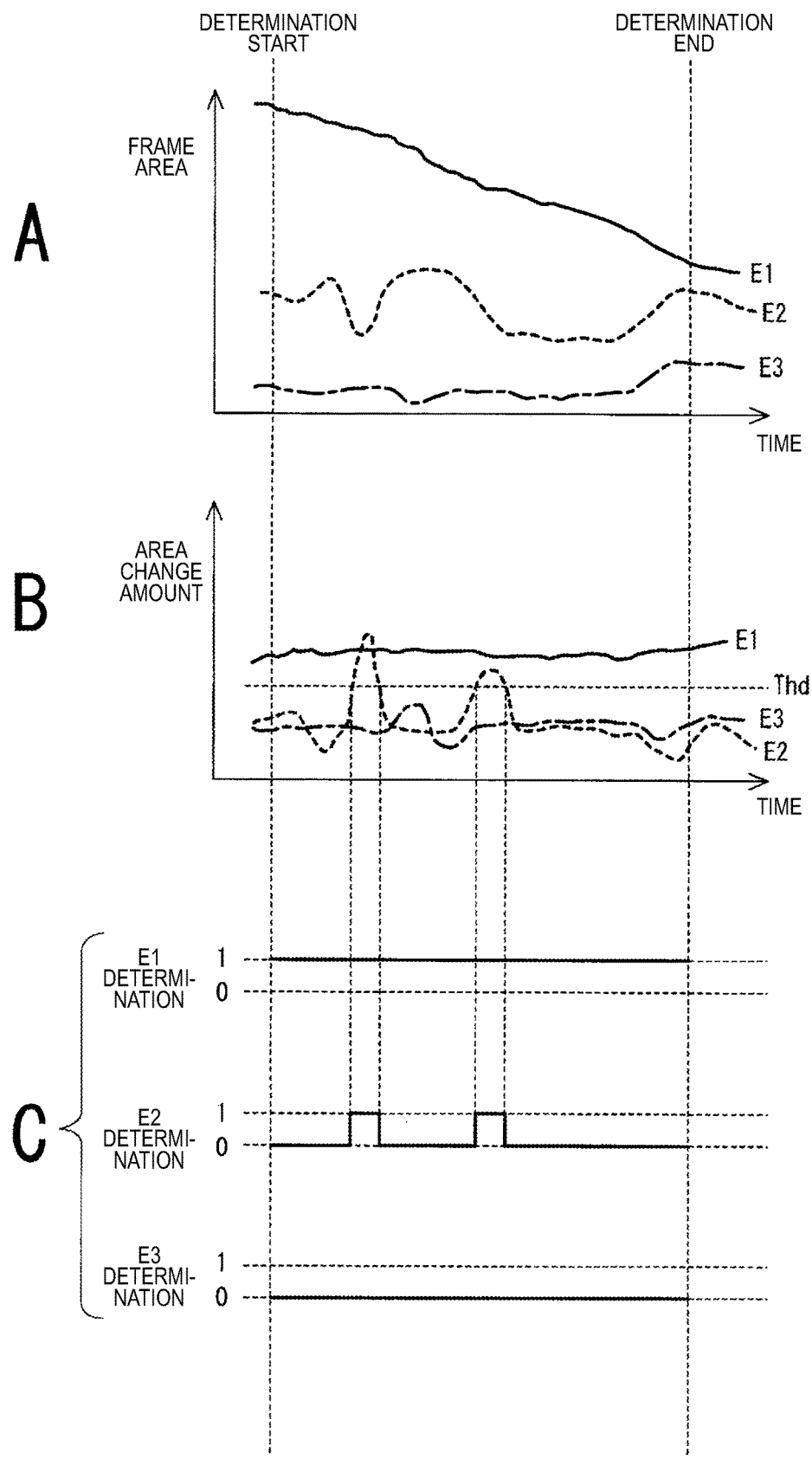
FIG. 9 is an explanatory diagram of recession determination of a third embodiment.

As in the first embodiment, when a period length of a continuous period, a cumulative period, or the like in which the determination result is "1" is counted, a subject that is receding on average or cumulatively, or continuously, that is, a subject with the tendency toward recession, can be determined. In the case of FIG. 9, the candidate image frame E1 is determined to be a subject with the tendency toward recession since the subject is receding on average, cumulatively, or continuously for some time.

Figure 10:
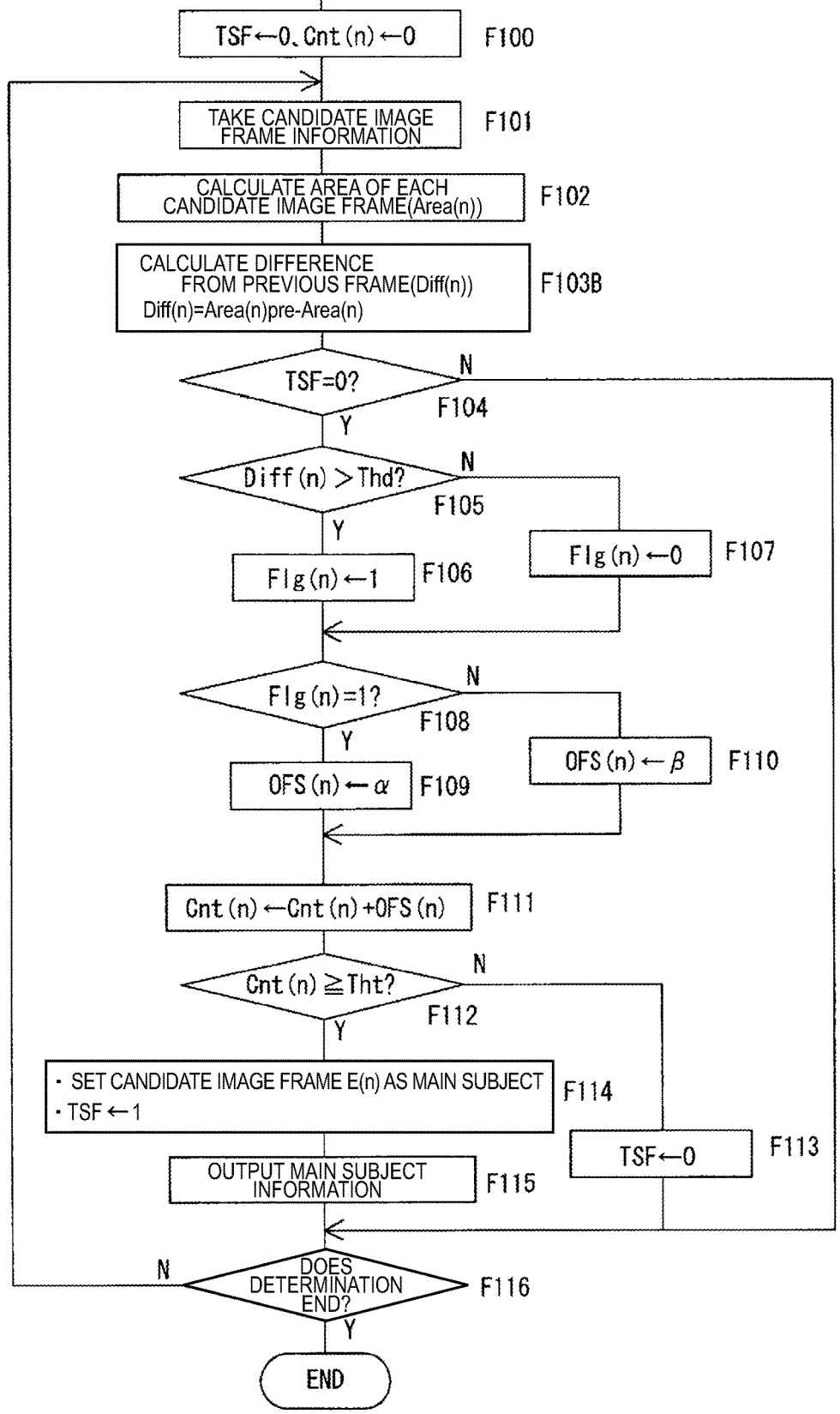
FIG. 10 is a flowchart of the recession determination and the main subject determination process of the third embodiment.

FIG. 10 shows a process example of recession determination and the main subject determination process of the control unit 30 (the main subject determination unit 30a and the distance change calculation unit 30b). The same step numbers are given to the same processes of FIG. 6 described above and the repeated description will be omitted. A difference from FIG. 6 is the process of Step F103B.

For example, the control unit 30 performs the processes of Steps F101 to F116 at a timing of every one frame. At this time, in Step F103B, the control unit 30 defines an area change amount Diff(n) of each candidate image frame E(n) as follows:

$$\text{area change amount Diff}(n)=\text{Area}(n)\text{pre}-\text{Area}(n).$$

Area(n)pre is a frame area Area(n) of the previous frame of the candidate image frame E(n). For example, the frame area Area(n) obtained in Step F102 when an image one frame before is a target is considered to be "Area(n)pre" at a process time point of the current frame.

The subsequent processes of Steps F104 to F116 are performed as in FIG. 6.

When the area change amount Diff(n) is calculated in Step F103B, as described above and the frame area is less than that of the previous frame (=the subject is receding), the value of the area change amount increases.

Therefore, when area change amount Diff(n) is compared to the distance determination threshold value Thd and the determination flag Flg(n) is set in Steps F105 to F107 and the process for the count value Cnt(n) is performed in Steps F108 to F111, the count value Cnt(n) reaches the time threshold Tht at a certain time point in Step F112 in the candidate image frame E(n) of the subject that is receding on average or cumulatively. In this case, the subject of the candidate image frame E(n) is assumed to have the tendency toward recession and is selected as the main subject in Step F114.

In the recession determination and the main subject determination process of FIG. 10, the tendency toward recession is determined in the plurality of frames among the extracted candidate images. Then, the main subject is determined based on the determination result of the tendency toward recession.

For example, a photographer holding a camera aims at a receding subject in many cases. When the photographer desires to photograph a subject that is moving at a high speed, such as a train, an airplane, or a subject in motor sports or desires to photograph a subject moving in a direction in which a wild bird, an animal, or the like is commonly receding from a person, the receding subject is automatically set as the main subject so that the process is appropriate for the photographer, thereby considerably improving operability at the time of imaging.

Even a user unaccustomed to an imaging manipulation can capture a still image or a moving image with high quality, for example, when focus control or exposure control is automatically performed on the main subject through the main subject determination.

Other various specific process examples can be considered as the recession determination and the main subject determination process. For example, the description at the time of the approach determination in FIG. 6 has been made. However, when β=0 is set in Step F110 even in the case of FIG. 10, the subject is determined to have the tendency toward recession in a case in which a situation in which the subject is cumulatively receding is detected. When β=−1 is set in Step F110, the subject is determined to have the tendency toward recession in a case in which a situation in which the subject is receding on average is detected. When the determination flag Flg(n)=0 is considered in Step F108 and the count value CNT(n) is reset to zero, only the subject that is continuously receding is determined to have the tendency toward recession.

According to the determination of the continuously receding subject to be the main subject with the tendency toward recession and setting the subject as the main subject, this determination and setting is appropriate for the main subject determination to be performed prudently. Particularly a subject such as a train, an airplane, a wild bird, or an animal that is receding is continuously receding in many cases. When such a target is intended to be imaged, the accuracy of the main subject determination is improved through continuous determination.

On the other hand, when a subject that is not observed to continuously move is intended to be imaged and when the determination of the main subject is desired to be performed in a short time or the main subject is desired to be set variously as easily as possible, the subject that is receding on average or cumulatively is appropriately determined to have the tendency toward recession.

In the cases of the cumulative determination, the average determination, and the continuous determination described above, it is appropriate that specific determination values corresponding to the time threshold value Tht are different.

For example, when the recession is detected in the continuous, cumulative, or average sense under the predetermined time condition, the subject is determined to have the tendency toward recession, but weight of the determination may be changed temporarily. Specifically, the value a substituted into the offset value OFS(n) set in Steps F109 is increased or conversely decreased step by step.

Further, a process example of setting a given determination period and setting, as the target of Step F114, the candidate image frame E(n) for which the count value CNT(n) is the largest or one or a plurality of candidate image frames E(n) for which the count value CNT(n) is equal to or greater than a predetermined value to determine the candidate image frame to be the main subject within the determination period can also be considered.

Another condition may be considered to be added as an AND condition to the determination of the tendency toward recession in order to determine a subject as the main subject. For example, the fact that a subject distance is equal to or greater a predetermined distance, the fact that a subject image has a size equal to or less than a predetermined size, the fact that a type of image is specific, or the fact that the center of a subject image with the tendency toward recession is within a predetermined distance (a distance based on the x and y coordinates) from the center point of a frame image may also be added to the condition.

By adding such conditions, it is possible to increase a probability of a subject that the photographer thinks to image more being determined to be the main subject as well as merely having the tendency toward recession. Accordingly, the user may be configured to select the additional conditions.

The idea of the second embodiment may be applied even to the determination of the tendency toward recession and another time threshold value Tht(ATn) may be used according to the attribute information.

7. Fourth Embodiment of Imaging Apparatus

A main subject determination process will be described according to the fourth embodiment. This embodiment is an example in which an approaching subject is determined to be the main subject with the idea of the block determination scheme described in FIG. 2C.

Figure 11:
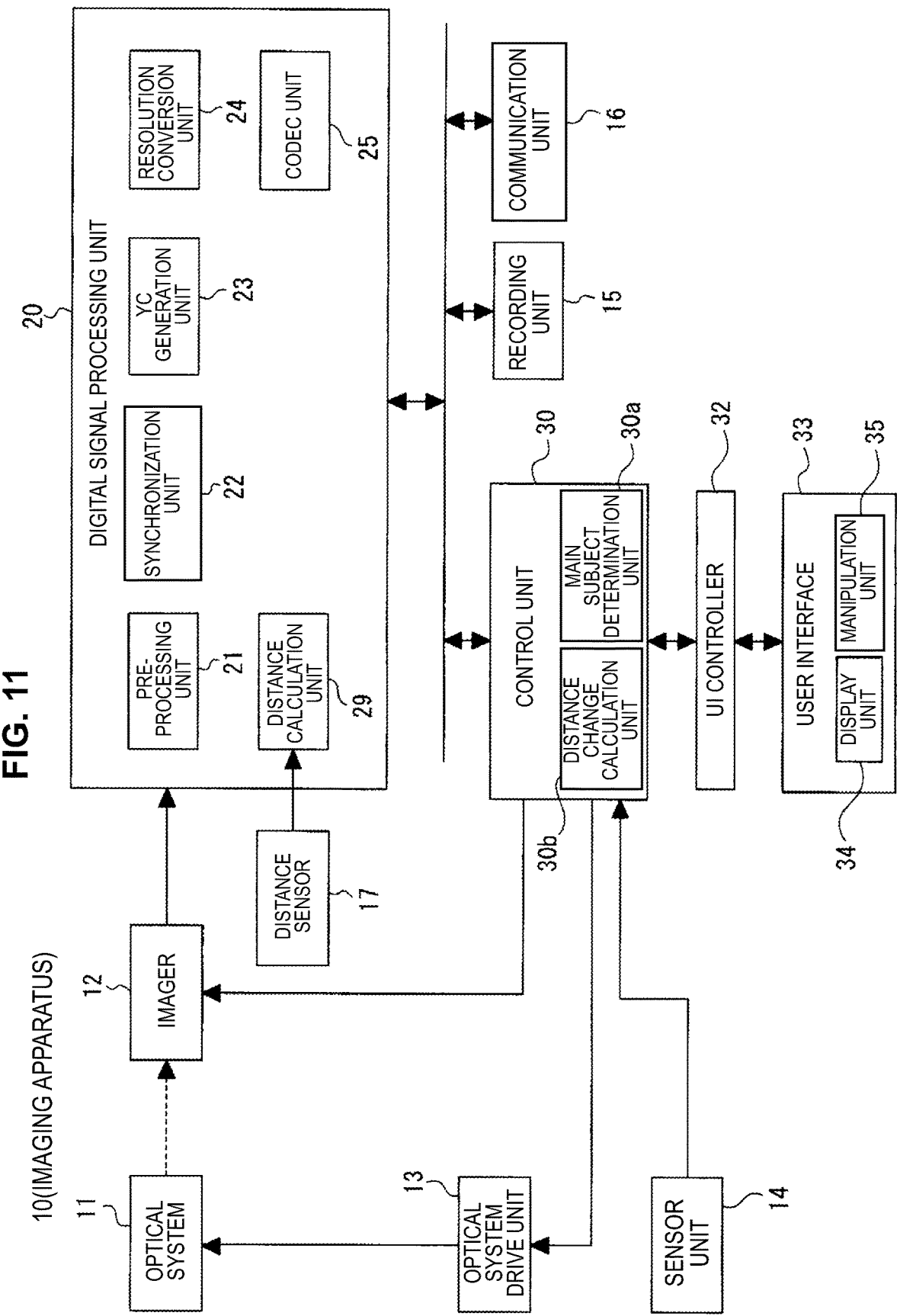
FIG. 11 is a block diagram of an imaging apparatus of a fourth embodiment.

In the case of the second embodiment, the configuration of an imaging apparatus 10 is shown in FIG. 11. In FIG. 11, the same reference numerals are given to the same portions as those of FIG. 3 and the description thereof will be omitted.

The imaging apparatus 10 in FIG. 11 includes a distance sensor 17 and has the function of a distance calculation unit 29 in the digital signal processing unit 20. The distance sensor 17 detects a subject distance in an imaging direction.

The distance calculation unit 29 calculates the subject distance for each of the division regions (block) divided from a captured image using a value detected by the distance sensor 17.

A known technology such as a phase difference sensor scheme, the Time-of-Flight scheme, or the Kinet scheme can be used as a subject distance detection technology by the distance sensor 17 and the distance calculation unit 29. For example, the phase difference sensor scheme is a scheme of obtaining a distance of a target subject from a distance (the number of pixels) between the pixels in which the same target subject is detected in captured images of the imager disposed on the right and left sides. The Time-of-Flight scheme is a scheme in which the distance sensor 17 emits and receives infrared light and divides a time taken to reflect the emitted infrared light from a target subject and receive the reflected light by the speed of the infrared light to obtain a distance.

FIG. 12 shows a distance detection operation for each block.

FIG. 12A shows frames FR1, FR2, FR3, . . . of captured image signals input to the digital signal processing unit 20 through an operation of the optical system 11 and the imager 12 of the imaging apparatus 10. In parallel to the inputting of the images, the distance sensor 17 operates to measure the distance of a subject and the detected information is input to the distance calculation unit 29.

The distance calculation unit 29 calculates the subject distance for each block in the frame image data FR1, FR2, FR3, . . . .

The functions of the main subject determination unit 30a and the distance change calculation unit 30b are provided in the control unit 30.

In the imaging apparatus 10, the configuration portion of the image processing device 1 described in FIG. 1 is as follows.

A configuration corresponding to the main subject determination unit 2 of the image processing device 1 in FIG. 1 is implemented as the main subject determination unit 30*a* on the control unit 30 of the imaging apparatus 10 by software. A configuration corresponding to the subject distance change determination unit 3 is implemented as the distance change calculation unit 30*b* and the distance calculation unit 29 by hardware or software.

In the example of FIG. 12, the distance calculation unit 29 is functionally configured to be executed by the digital signal processing unit 20, but this is merely an example. The function of the distance calculation unit 29 can be considered to be implemented on the control unit 30 by software.

FIG. 12B shows an example of the blocks which are division regions. One piece of image data is divided into a plurality of blocks, as indicated by a dotted line. As shown in the lower part of FIG. 12B, the blocks are referred to as blocks BK (BK1, BK2, . . . BK(M)) for description.

The distance calculation unit 29 obtains the subject distance for each of the blocks BK (BK1, BK2, . . . BK(M). In the lower port of FIG. 12B, the subjects distances of the blocks BK are exemplified (numerical values in meters or infinity ∞). For example, 20 m is exemplified for the block BK4 and infinity ∞ is exemplified for the block BK3.

For example, the distance calculation unit 29 obtains the subject distance for each block BK in this way in each frame, and then transmits or receives distance information of each block BK to and from the control unit 30.

FIG. 13A shows a change in the subject distance calculated in each frame in regard to each block BK. Here, the blocks BK1, BK2, and BK(x) are exemplified.

In this example, the distance of a subject pictured in the block BK(x) is gradually shortened. The distances of the subjects pictured in the blocks BK1 and BK2 are slightly changed, but are not considerably changed on average.

The same subjects are not necessarily located at the same blocks on the captured image data. Here, during a period from the start of the determination to the end of the determination, the same subjects (for example, person A, person C, and person C) are assumed to be pictured at the blocks BK1, BK2, and BK(x). Actually, when a subject moves in the horizontal direction with respect to the imaging apparatus 10 or a photographer pans or tilts the imaging apparatus 10, the blocks in which a certain subject is imprinted are changed for each frame. Because of consideration of a necessity of such a situation, a time matching process is applied for each block in Step F202 in the process example of FIG. 14 to be described.

Now, the description will continue assuming that person A, person B, and person C are continuously pictured in the blocks BK1, BK2, and BK(x) of FIG. 13A in each frame FIG. 13B shows transition of the distance change amount of each of the blocks BK1, BK2, and BK(x). For example, a value at each time point is shown as a difference obtained by subtracting the distance in a previous frame from the distance in a current frame in regard to each block BK. Accordingly, when the relative distance of the subject present within the block BK with respect to the imaging apparatus 10 decreases more than at a previous time point, the distance change amount is a small value (negative value). When the relative distance is not changed, the distance change amount is 0. When the relative distance increases, the distance change amount is a large value.

Accordingly, a determination result of each block BK is obtained using the distance determination threshold value Thd used to determine whether the subject becomes closer is obtained by the distance change amount. When the distance change amount is less than the distance determination threshold value Thd, the subject of the block BK is determined to approach by a distance equal to or greater than a predetermined distance at that time point.

FIG. 13C shows the determination results of the blocks BK1, BK2, and BK(x). This is assumed to be a flag with an "H" level when the distance change amount is less than the distance determination threshold value Thd.

As understood from the drawing, the determination result of the block BK(x) is continuously "1." For the block BK2, "1" is set during only a certain period so that temporary approach is indicated. The determination result of the BK1 is continuously set to "0."

In this example, a subject that is approaching on average, cumulatively, or continuously for some time is determined to be a subject with the tendency toward approach. A subject for which a period in which the determination result of FIG. 13C is "1" is long is determined to be the subject with the tendency toward approach. For example, when a time length of a continuous period, a cumulative period, or the like in which the determination result is "1" is counted, the tendency toward approach can be determined.

For example, since the determination result of the block BK(x) is "1" and the period is long, a subject contained in the block BK(x) can be determined to have the tendency toward approach during this determination period.

The block BK2 can be said to be, for example, a block in which a subject that is temporarily approaching or receding is contained. The block BK1 is a block in which a subject that is kept at a relatively distant position is contained.

A period from the start of the determination to the end of the determination differs according to a specific process example. In a process example of FIG. 14 to be described below, a period length in which the determination result is "1" is counted and a subject of the block BK is determined to have the tendency toward approach when the period length reaches a predetermined time. In this case, for example, when there is a subject for which the determination result is normally "1" as in the block BK(x), a timing of the end of the determination is quickened. That is, the determination period length changes depending on a situation of the determination process. As another example, the period from the determination start to the determination end is set as a fixed period length.

A specific example of the approach determination and the main subject determination process by the control unit 30 will be described with reference to FIG. 14. A process to be described below is a process performed by the functions of the distance change calculation unit 30*b* and the main subject determination unit 30*a* of the control unit 30.

When the control unit 30 starts the approach determination and the main subject determination process, first, the variable TSF=0 (the main subject is not determined) which is a flag indicating whether the setting of the main subject is completed is set and a count value bCnt(m)=0 is set as initial setting in Step F200.

The count value bCnt(m) is the value of a counter for determining a time length in regard to a determination result obtained by comparing the above-described distance change amount and the distance determination threshold value Thd. Note that "m" indicates natural numbers of 1, 2, 3 . . . and the count value bCnt (m) is set to be a count value corresponding to each block of the blocks BK1, BK2, BK3, . . . , BK(M). For the sake of the process, bCnt1, bCnt2, . . . , and bCnt(M) are used as count values in regard to the blocks BK1 to BK(M). For the sake of description of the flowchart, a process with regard to the count value bCnt(m) is assumed to refer to a process performed on each of the count values bCnt1, bCnt2, . . . , and bCnt(M).

Figure 14:
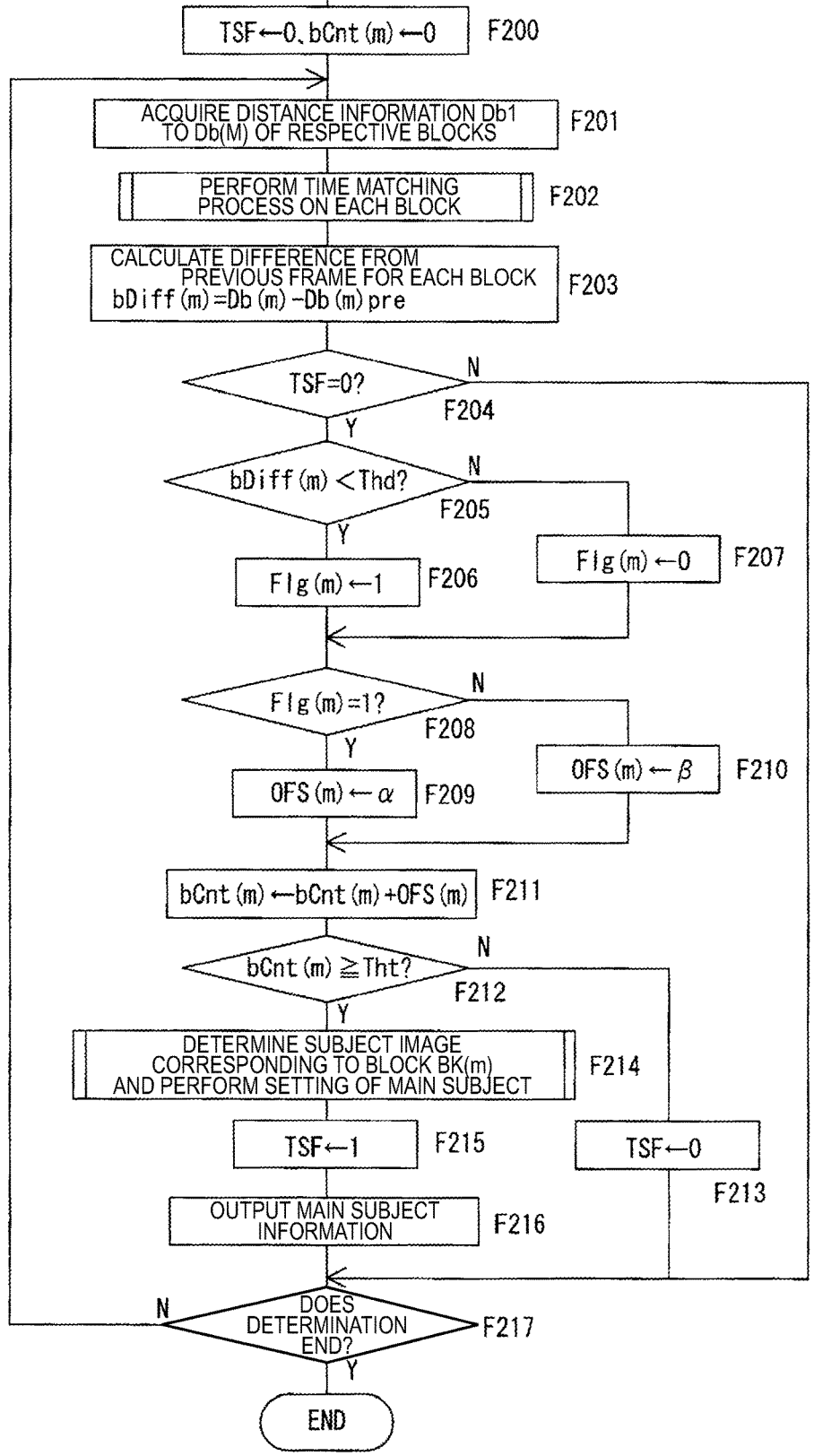
FIG. 14 is a flowchart of the approach determination and a main subject determination process of the fourth embodiment.

Db(m) described in the process of FIG. 14 indicates a distance detected in regard to each block and bDiff(m) indicates a distance change amount of each block BK. A process with regard to the distance Db(m) and the distance change amount bDiff(m) is used to mean a process for the distance and the distance change amount with regard to the blocks BK1 to BK(M).

The same also applies to a determination flag Flg(m) and an offset value OFS(m).

For example, the control unit 30 performs the processes of Steps F201 to F217 at a timing of every one frame.

In Step F201, the control unit 30 takes pieces of distance information Db1 to Db(M) with regard to the respective blocks BK1 to BK(M) in a certain frame from the distance calculation unit 29. The information is, for example, information regarding the values of the distances shown in the lower part of FIG. 12B.

The control unit 30 performs the time matching process on each block BK in Step F202 and obtains the distance change amount bDiff(m) for each block BK in Step F203. That is, the distance change amount bDiff(m) is a difference between a distance value of a current frame and a distance value of a previous frame.

That is, "distance change amount bDiff(m)=Db(m)−Db(m)pre" is obtained. Db(m)pre is a distance value of the corresponding block BK(m) in the previous frame of a current processing target block BK(m).

Here, the time matching process of Step F202 will be described with reference to FIGS. 15 and 16. As described above, the same subjects are not necessarily located at the same blocks on the captured image data of each frame when time passes. When a relative position between a subject and the imaging apparatus 10 in the horizontal and vertical directions is changed, for example, the subject located at the block BK4 in the immediately previous frame is located at the block BK5 in the current frame in some cases. In consideration of this case, a distance difference from the previous frame of the block BK5 is output, this difference is not the distance change amount of the subject. Accordingly, matching (tracking) a subject with a block is performed in Step F202.

Figure 16:
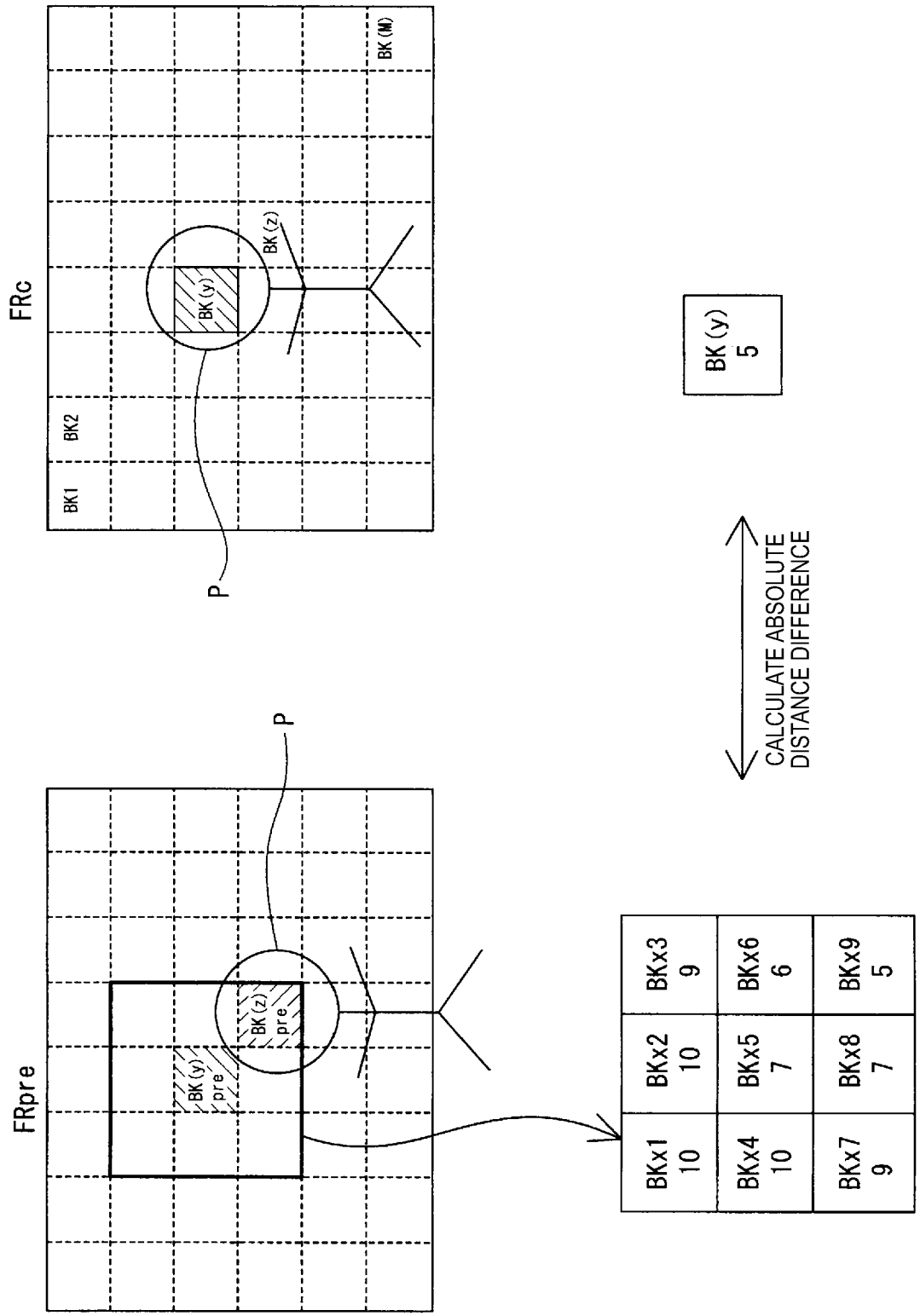
FIG. 16 is an explanatory diagram of the time correspondence process in each block of the fourth embodiment.

The description will be schematically made with reference to FIG. 16. FIG. 16 shows a case in which a position of a certain subject P in an image deviates between a current frame FRc and a previous frame FRpre.

In the current frame FRc, a face portion of the subject P is assumed to be present in a block BK(y). However, in the previous frame FRpre, the face portion is not present in the same block BK(y)pre and is located in a block BK(z)pre. Since it is originally necessary to obtain a distance change of the subject P, a distance change amount bDiff(y) desired to be obtained in the block BK(y) of the current frame FRc is a difference from the distance value of the block BK(z)pre of the previous frame FRpre in this case. Accordingly, the time matching process is performed so that the block BK(z)pre mentioned here is considered to be the block of the previous frame with regard to the block BK(y).

The time matching process of Step F202 will be described with reference to FIG. 15.

Figure 15:
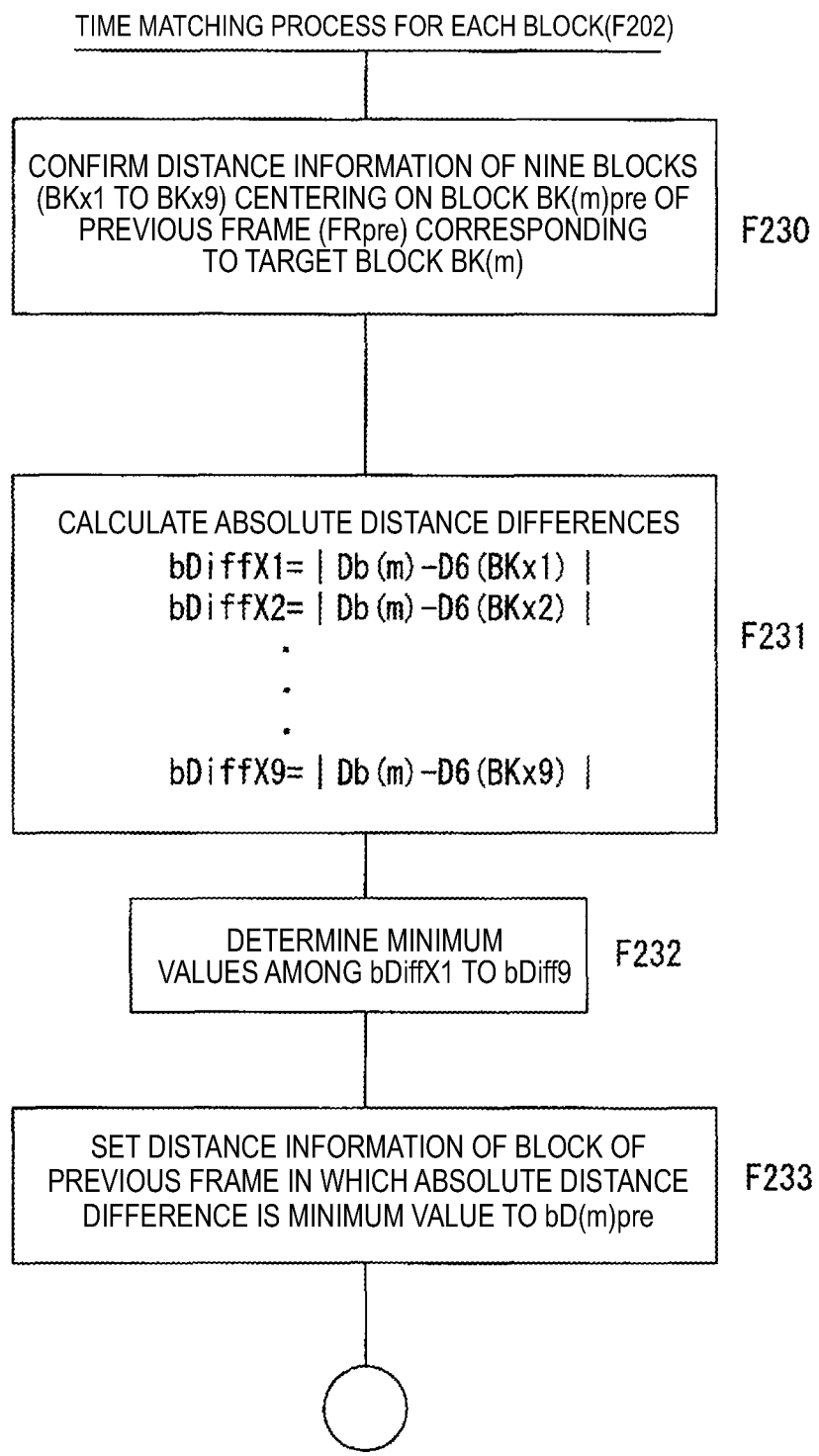
FIG. 15 is a flowchart of a time correspondence process in each block of the fourth embodiment.

In Step F230 of FIG. 15, the control unit 30 first confirms distance information of nine blocks centering on a block BK(m)pre of the previous frame FRpre corresponding to the target block BK(m) of the current frame FRc.

As for the block BK(y) in FIG. 16, the control unit 30 confirms nine blocks surrounded by a thick frame centering on the same block BK(y)pre of the previous frame FRpre. As shown in the drawing, the nine blocks are referred to as BKx1 to BKx9. The distance values of the blocks BKx1 to BKx9 are assumed to be "10," "10," "9," "10,", "7," "6," "9," "7," and "5" (units are, for example, meters). The distance value of the block BK(y) of the current frame is assumed to be "5," as shown in the drawing.

When the distance value of each of the blocks BKx1 to BKx9 is confirmed, the control unit 30 calculates absolute distance differences bDiffX1 to bDiffX9 between the target block BK(m) of the current frame FRc and the respective corresponding blocks BKx1 to BKx9 of the previous frame FRpre in Step F231 as follows.

$$bDiffX1 = |Db(m) - Db(BKx1)|$$
$$bDiffX2 = |Db(m) - Db(BKx2)|$$
$$\ldots$$
$$bDiffX9 = |Db(m) - Db(BKx9)|$$

Here, the distance Db(m) is a distance value of the target block BK(m) and is a distance value "5" of the block BK(y) in the example of FIG. 16.

The distances Db(BKx1) to Db(BKx9) are distance values of the nine blocks BKx1 to BKx9 and are the above-described values "10," "10," "9," "10,", "7," "6," "9," "7," and "5" in the example of FIG. 16.

In Step F232, the control unit 30 determines the minimum value of the absolute distance difference among bDiffX1 to bDiffX9. Then, in Step F233, the block in which the absolute distance difference is the minimum value is set to the block BK of the previous frame corresponding to the current target block BK(m) and the distance Db of the block BK is set to the distance Db(m)pre of the previous frame. Then, the calculation of the distance change amount "bDiff(m)=Db(m)−Db(m)pre" in Step F203 of FIG. 14 is performed using the distance Db(m)pre.

For example, in the example of FIG. 16, since the block BKx9 is the block in which the absolute distance difference is the minimum, the block of the previous frame corresponding to the processing target block BK(y) is the block BKx9 and the distance value Db(m)pre=5 is considered.

That is, in regard to the blocks of the current frame, the block in which the absolute distance difference is small is searched for near the same blocks of the previous frame and the block is set as the corresponding block (of the same subject) under the assumption that the subject distances or the positions in the horizontal and vertical directions are mostly not changed for the time of one frame.

In Step F202 of FIG. 14, the matching is performed on each block BK in this way. Thus, the distance change amount bDiff(m) calculated in Step F203 in regard to each block BK(m) indicates a distance change of the same subject.

In Step F204, the control unit 30 confirms the variable TSF. When the variable TSF=0 is set, the process proceeds to Step F205. The meaning of Step F204 is the same as that of Step F104 of FIG. 6.

In Steps F205, F206, and F207, the control unit 30 confirms whether the distance change amount bDiff(m) of each block BK(m) indicates the approach.

That is, whether the distance change amount bDiff(m) is a change amount indicating the approach of a predetermined amount or more is determined using the distance determination threshold value Thd, as described in FIG. 13B.

Therefore, in Step F205, the control unit 30 compares the distance change amount bDiff(m) of each block BK to the distance determination threshold value Thd. When "bDiff(m)<Thd" is satisfied, the determination flag Flg(m)=1 (approaching) is set in Step F206. When "bDiff(m)<Thd" is not satisfied, the determination flag Flg(m)=0 (not approaching) is set in Step F207.

The determination flag Flg(n) corresponds to the determination result of "1" or "0" described in FIG. 13C.

Subsequently, in Steps F208, F209, and F210, the control unit 30 sets the offset value OFS(m) for a counting process depending on whether the determination flag Flg(m) is "1" or "0."

For example, the control unit 30 sets the offset value OFS(m)=α in Step F209 when the determination flag Flg(m)=1 is set. Here, a is a predetermined value for incrementing the counter. For example, α=1 is set.

The control unit 30 sets the offset value OFS(m)=β in Step F210 when the determination flag Flg(m)=0 is set. Here, β is a predetermined value for keeping a count value or decrementing a count value. When the count value is kept, β=0 is set. When the counter is decremented, for example, β=−1 is set.

Then, in Step F211, the control unit 30 performs a process of the count value bCNT(m) of the counter counting a time length in which approach is observed.

Specifically, bCNT(n)=bCNT(m)+OFS(m) is set.

When α=1 is considered and the offset value OFS(m) is set in the foregoing Step F209, the count value bCNT(m) is incremented.

When β=0 (or β=−1) is considered and the offset value OFS(m) is set in Step F210, the count value bCNT(m) is kept (or is decremented).

The count value bCNT(m) is incremented when the approach is detected. Therefore, the count value is a value corresponding to the length of the period in which the subject of the block BK(m) is detected to approach. When the approach is not detected (for example, a situation in which a subject person stops) and the count value bCNT(m) is configured to be kept, the count value bCNT(m) is a cumulative value of the approach detection. Therefore, when the approach is detected many times, the count value bCnt(m) increases. When the approach is not detected and the count value bCNT(m) is configured to decrease, the count value bCNT(m) increases according to the average approach. However, when the approach is not detected and the count value is decremented, the count value bCNT(n) increases according to the average approach. However, when the approach is not detected, the count value decreases. Thus, when the subject temporarily stops or recedes, subsequent determination of the tendency toward approach may be disadvantageous.

Then, in Step F212, the control unit 30 determines whether each block BK(m) has the tendency toward approach. Specifically, the control unit 30 determines whether the count value bCNT(m) indicating the time length of the approach detection becomes a value equal to or greater than the predetermined time threshold value Tht.

When none of the count values bCnt(m) of the blocks BK(m) reaches the time threshold value Tht, the variable TSF=0 remains in Step F213, the end of the determination is not determined in Step F217, and the process returns to Step F201. In this case, the process after Step F201 is performed, as described above, based on distance information Db(m) of each block BK(m) input for a subsequent frame.

In Step F217, when the variable TSF=0 is set, the main subject determination is assumed not to be completed and the determination process continues. When the variable TSF=1 is set, the main subject determination is assumed to be completed. This step is the same as Step F116 of FIG. 6. For example, even when the main subject is set through a user's manual manipulation performed in parallel, the process from Step F217 may end (interruption end).

The main subject determination performed through the approach determination is performed during a certain time length. Therefore, when the process is not performed on each block BK(m) for some time (the number of frames), the determination does not end in Step F217, the process returns to Step F201, and the process is repeated.

Figure 13:
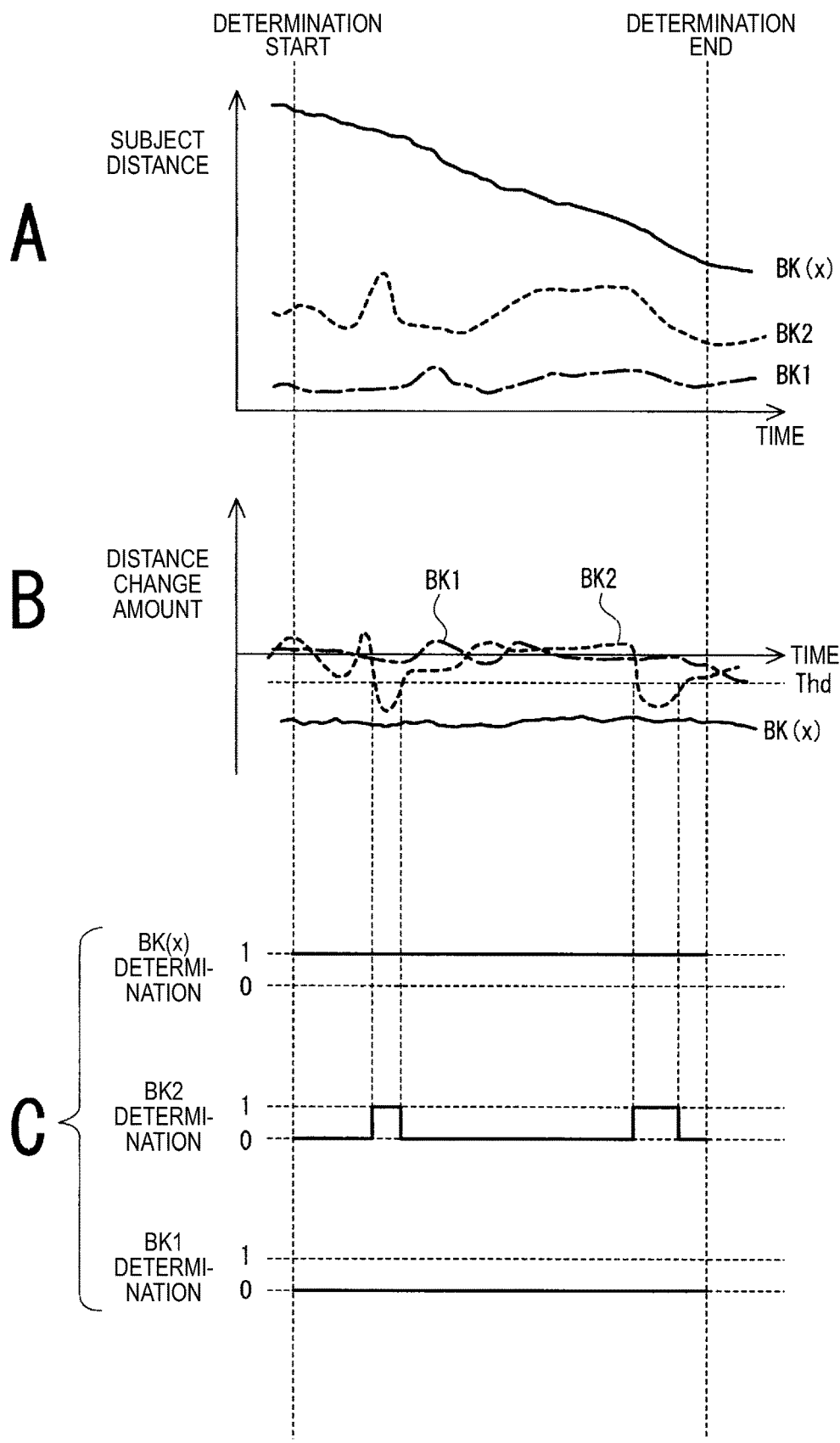
FIG. 13 is an explanatory diagram of approach determination of the fourth embodiment.

Here, for example, as shown in FIG. 13, the certain block BK(x) may be discontinuous, but there is a situation in which the approach of a subject is detected in a plurality of frames. Then, there are many opportunities in which the count value bCnt(x) of the block BK(x) is incremented in Step F211 as time passes, and thus the count value bCnt(x) advances earlier than the count values bCnt1, bCnt2, and the like of the other blocks. Then, at a certain time point, the count value bCnt(x) first reaches the time threshold value Tht.

In this case, the control unit 30 causes the process to proceed from Step F212 to Step F214.

In Step F214, the control unit 30 determines that the block BK(m) for which the count value bCnt(m) reaches the time threshold value Tht is the block in the main subject is contained and performs the setting of the main subject. That is, the block in which the subject is approaching on average during a certain period is determined to be the block in which the subject has the "tendency toward approach" and setting of the main subject is performed. Then, in Step F215, the variable TSF=1 is set.

Then, in Step F216, the main subject information is output to be transmitted to or received from, for example, an application program or a control program using the main subject information.

In this case, the determination is considered to end in Step F217.

Here, the setting of the main subject will be described in Step F214. In the case of the process of FIG. 14, the determination of the tendency toward approach in Step F212 is performed in units of the blocks BK and is not necessarily performed in units of subjects. Thus, in Step F214, a subject range is searched for based on the blocks and the subject range is determined to be the main subject.

Figure 17:
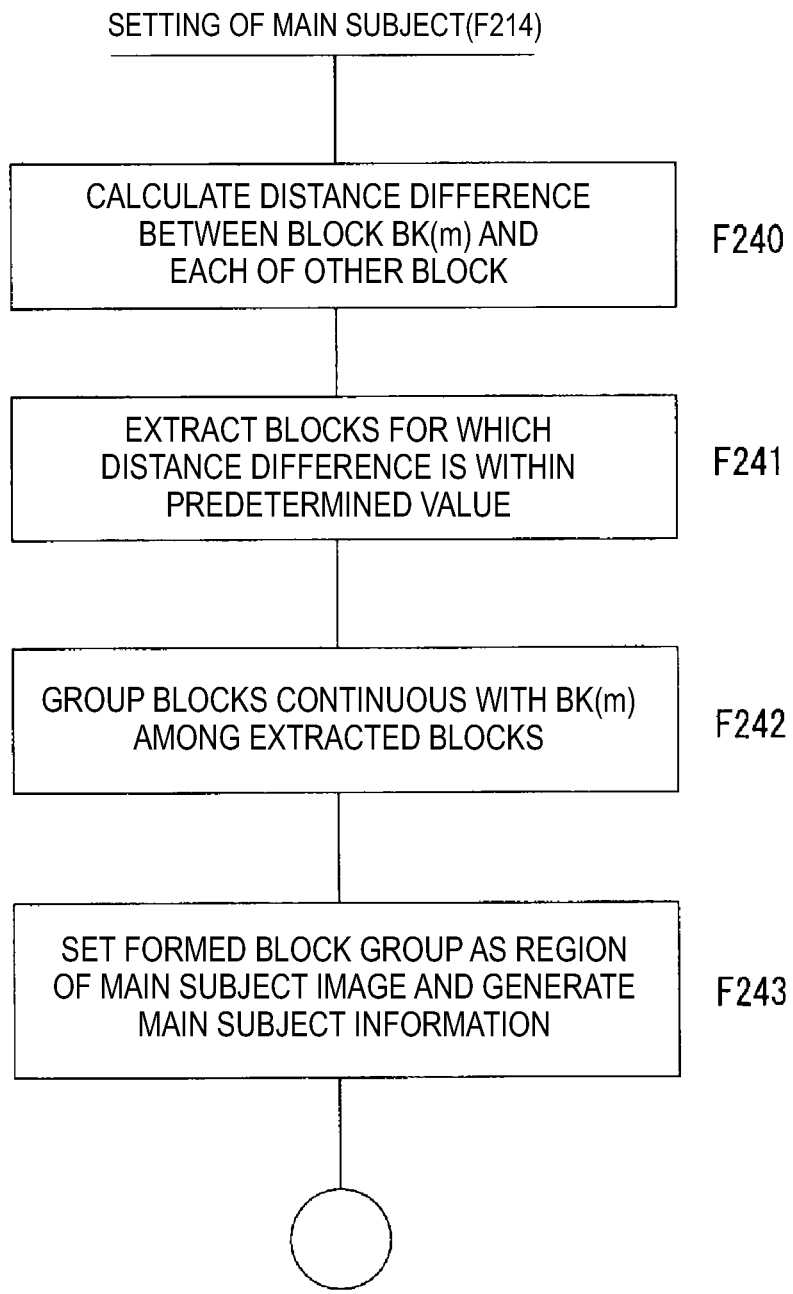
FIG. 17 is a flowchart of a main subject setting process of the fourth embodiment.

The detailed description will be made with reference to FIGS. 17 and 18.

FIG. 18A shows a part of the image data of one frame. Dotted lines indicate the blocks BK.

Now, it is assumed that a subject P is approaching and a certain block BK(p) is determined to have the tendency toward approach at a certain time point in Step F212. Here, the block BK(p) is a part of the subject P and it is not appropriate that only the portion of the block BK(p) is set as the main subject. Accordingly, to set the range of the subject P as the main subject, the control unit 30 performs a process shown in FIG. 17 in Step F214.

First, in Step F240, a distance difference between the block BK(m) determined to have the tendency toward approach in Step F212 and each of the other blocks BK is calculated. That is, differences of the distance values between, for example, the block BK(p) in FIG. 18A which is the block BK(m) and all of the other blocks BK1 to BK(M) (here, excluding the block BK(p)) in the frame are calculated. Then, in Step F241, the blocks BK for which the distance difference is within a predetermined value are extracted.

The blocks BK indicated by the diagonal lines in FIG. 18B are the blocks for which the distance difference from the block BK(p) is within the predetermined value.

Figure 18:
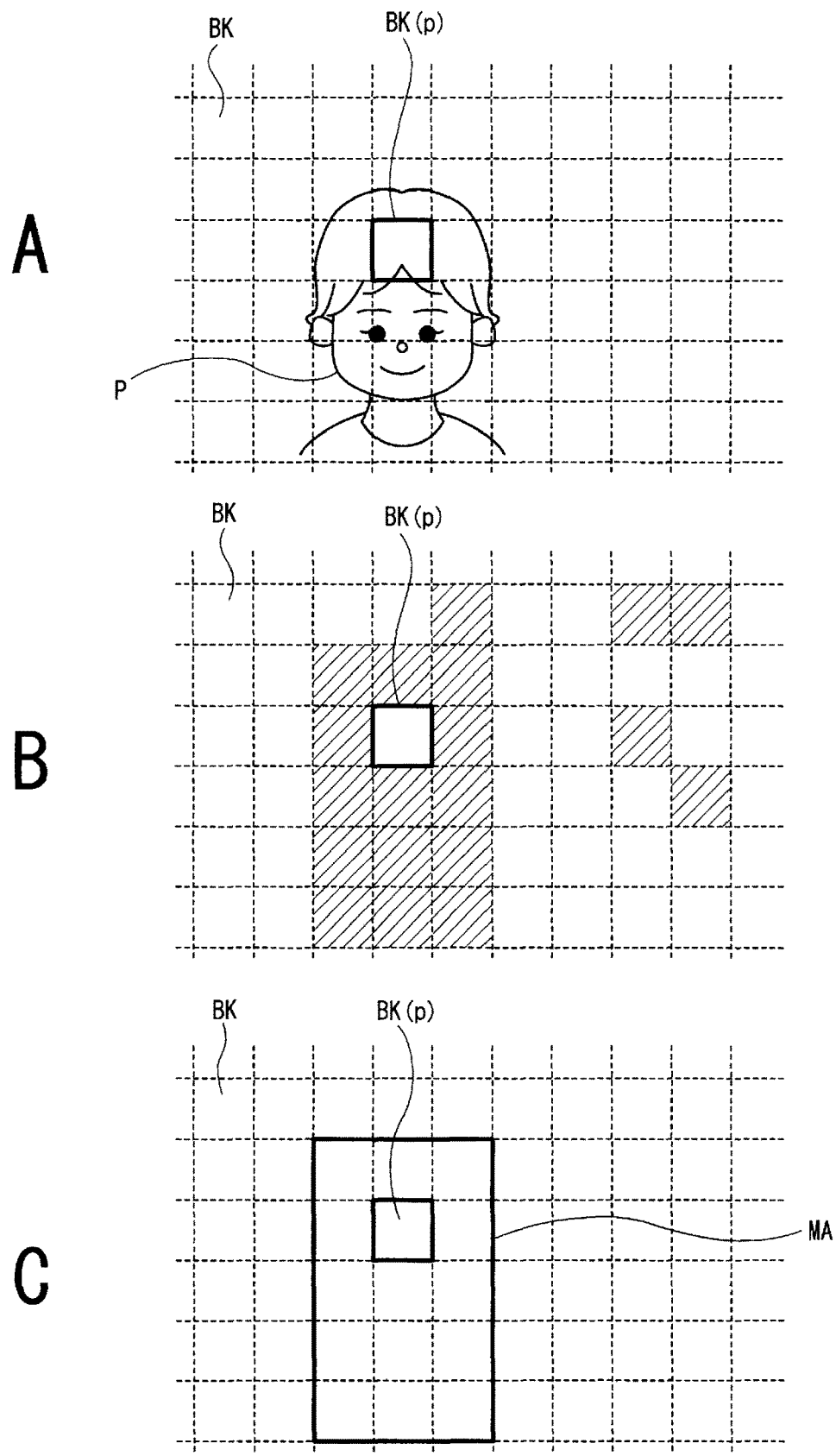
FIG. 18 is an explanatory diagram of the main subject setting process of the fourth embodiment.

Next, in Step F242, the control unit 30 groups the blocks continuous with the block BK(m) (the block BK(p) in FIG. 18) determined to have the tendency toward approach among the blocks BK extracted in the above-described manner. The continuous blocks refer to the blocks with a relation physically continuous on an image plane, such as the blocks adjacent to the block BK(p) and the blocks also adjacent to the adjacent blocks. For example, a block group MA shown in FIG. 18C is formed.

Then, in Step F243, the control unit 30 sets the formed block group MA as a region forming a main subject image, sets this image range as the main subject, and generates main subject information.

Consequently, the number of blocks grouped irrespective of the other blocks in Step F242 is only one block in some cases. In this case, only the range of the block BK(m) determined to have the tendency toward approach may be determined to be the main subject.

When the determination of the tendency toward approach in units of blocks is achieved by performing such a process, the image region of a certain subject can be appropriately set to the main subject image based on the blocks. This is because the differences of the distance values mostly do not occur when the subject is the same, and thus the range of the subject can be appropriately determined by extracting the blocks for which the distance differences are small and grouping the continuous blocks, as described above.

The region of the subject image set as the main subject may be a region of the formed block groups or a region of a plurality of blocks may be set as a region of the main subject image in a shape similar to a circular shape, an elliptical shape, or a square shape.

Further, image analysis may be performed in the range of the formed block group, a contour is determined through face detection, body detection, or the like, and the contour may be determined to be the main subject.

Another process may be performed to determine the main subject in Step F214 in addition to the above-described process. For example, as in the first embodiment, the candidate detection unit 27 may be provided in the digital signal processing unit 20 or the control unit 30 and candidate images may be extracted in parallel to the process of FIG. 14. In this case, a candidate image frame in which the block BK(m) determined to have the tendency toward approach in Step F212 may be searched for and a subject of the candidate image frame may be set as the main subject.

In this way, the approach determination and the main subject determination process are performed.

In the approach determination and the main subject determination process, the tendency toward approach is determined in a plurality of frames for each of the blocks divided from an image. Then, the setting of the main subject is performed based on the determination of the blocks of the tendency toward approach. Thus, operability at the time of imaging is considerably improved as in the first embodiment. A still image or a moving image with high quality can be captured, for example, when focus control or exposure control is automatically performed on the main subject through the main subject determination.

Other various specific process examples can be considered as the approach determination and the main subject determination process. For example, as described at the time of the approach determination of FIG. 6, even in the case of FIG. 14, when β=0 is set in Step F210, the tendency toward approach is determined in the case of the detection of a situation of cumulative approach. When β=−1 is set in Step F210, the tendency toward approach is determined in the case of the detection of a situation of average approach. When the determination flag Flg(n)=0 is considered in Step F208 and the count value bCNT(m) is reset to zero, only the block BK that is continuously approaching is determined to have the tendency toward approach. In each case, the advantages described in the first embodiment can be obtained.

For example, when the approach is detected in the continuous, cumulative, or average sense under a predetermined time condition, the subject is determined to have the tendency toward approach, but weight of the determination may be changed temporarily. Specifically, the value a substituted into the offset value OFS(m) set in Steps F209 are increased or conversely decreased step by step.

Further, a process example of setting a given determination period and setting, as the target of Step F214, the block BK(m) for which the count value bCNT(m) is the largest or one or a plurality of blocks BK(m) for which the count value bCNT(m) is equal to or greater than a predetermined value to determine the block BK to be the main subject within the determination period can also be considered.

Another condition may be considered to be added as an AND condition to the determination of the tendency toward approach in order to determine a subject as the main subject. For example, the fact that a subject distance of the block BK(m) is less than a predetermined distance, the fact that a subject contained in the block BK(m) is a specific type of image, or the fact that the block BK(m) is within a predetermined distance (a distance based on the x and y coordinates) from the center point of a frame image may also be added to the condition.

All of the blocks BK1 to BK(M) have been set as the targets and the process has been performed. However, for example, some of the blocks BK such as only the blocks BK near the middle portion of the image data may be set as the targets and the process of FIG. 14 may be performed. For example, when a photographer is considered to adjust an imaging direction to catch a subject that the photographer thinks to set as the main subject in the middle portion as much as possible, only the blocks BK near the middle portion can be set as targets and the process of FIG. 14 can be performed, thereby improving the accuracy of the setting of the main subject. Further, the processing load of the control unit 30 can be reduced.

The time matching process described in FIGS. 15 and 16 has been performed in Step F202 of FIG. 14, but a process example in which the time matching process is not performed can also be considered.

If the time matching process on each block is not performed, the blocks BK and a subject correspond with each other continuously during a determination period only when a certain subject comes straight from the front to approach in the direction of the imaging apparatus 10. For example, when a subject approaching in an oblique direction, a situation in which the subject is contained in other blocks BK as a frame progresses occurs.

Conversely, if the time matching process on each block is not performed, only a subject approaching naturally from the front can be selected as the main subject. That is, a case in which the tendency toward approach in the front direction is set as a determination condition of the main subject may be a process example in which Step F202 of FIG. 14 is not performed.

The division of the blocks BK can be considered in various manners.

In the above-described embodiments, the blocks BK1 to BK(M) have been described. However, various division numbers such as division into 4, 6, 8, 9, . . . , 30, and 40 can be considered.

As the number of blocks is large, the processing burden of the approach determination increases. However, even when a zoom state or a subject is small, the main subject determination can be performed with high certainty. In contrast, as the number of blocks is small, the processing burden decreases.

All of each block BK to be divided do not have to have the same sizes or the same area shape. It is also considered that, for example, one block BK of the end parts of an image is set as a wide range and the center part of the screen is divided into fine block BKs. Considering that a main subject is highly likely to be positioned in the periphery of the center of the screen, dividing the center of the screen into small areas is appropriate.

8. Application to a Program and a Computer Device

Hereinabove, the embodiments of the image processing device 1 and the imaging apparatus 10 have been described, and the above-described main subject determination process can be executed by hardware, or by software.

A program of an embodiment is a program that causes an arithmetic processing device, for example, a CPU (Central Processing Unit), a DSP (Digital Signal Processor), or the like, to execute the processes shown in the above-described embodiments.

That is, the program is a program causing an arithmetic processing device to perform a process of detecting a temporal change of a distance from an imaging position in regard to a subject present in an image and determining the tendency toward approach or recession of a subject with respect to the imaging position based on the detection and a process of determining the main subject based on the determined tendency toward approach or recession of each subject.

To be specific, the program of the embodiment may be a program that causes the arithmetic processing device to execute the process shown in FIG. 2, FIG. 6, FIG. 8, FIG. 10 or FIG. 14.

Using such a program, a device that executes the above-described main subject determination can be realized using the arithmetic processing device.

Such a program can be recorded in advance on an HDD as a recording medium embedded in an appliance such as a computer device, a ROM in a microcomputer having a CPU, and the like.

Alternatively, the program can be temporarily or permanently stored (recorded) in a removable recording medium such as a flexible disk, a CD-ROM (Compact Disc Read Only Memory), a MO (Magnet optical) disc, a DVD (Digital Versatile Disc), a Blu-ray Disc (registered trademark), a magnetic disk, a semiconductor memory, or a memory card. Such a removable recording medium can be provided as so-called package software.

Furthermore, such a program can be downloaded from a download site through a network such as a LAN (Local Area Network) or the Internet, in addition to the installation from the removable recording medium to a personal computer and the like.

Furthermore, such a program is suitable for the image processing device of the embodiment to be extensively provided. For example, the program is downloaded to a personal computer, a portable information processing apparatus, a cellular phone, a game device, a video player, a PDA (Personal Digital Assistant) and the like, so that the portable information processing device and the like are available as the image processing device according to an embodiment of the present disclosure.

For example, in the computer device as illustrated in FIG. 19, the same process as the main subject determination process can be performed in the image processing device 1 of FIG. 1, and the imaging apparatus 10.

In FIG. 19, a CPU 71 of a computer device 70 performs various processes according to a program stored in a ROM 72 or a program loaded from a storage unit 78 to a RAM 73. Furthermore, the RAM 73 appropriately stores data and the like which are necessary when the CPU 71 performs the various processes.

The CPU 71, the ROM 72, and the RAM 73 are connected to one another through a bus 74. Furthermore, an input and output interface 75 is also connected to the bus 74.

The input and output interface 75 is connected to an input unit 76 including a keyboard, a mouse and the like, an output unit 77 including a display such as a CRT (Cathode Ray Tube), an LCD, or an organic EL panel, and a speaker, the storage unit 78 including a hard disk, and a communication unit 79 including a modem and the like. The communication unit 79 performs a communication process through a network including the Internet.

Furthermore, a drive 80 is connected to the input and output interface 75 according to necessity, a removable medium 81 such as a magnetic disk, an optical disc, a magneto optical disc, or a semiconductor memory is appropriately mounted thereon, and a computer program read from the drive is installed in the storage unit 78 according to necessity.

When the aforementioned main subject determination process is performed by software, a program constituting the software is installed from a network or a recording medium.

The recording medium, for example, as illustrated in FIG. 19, is configured by the removable medium 81 including a magnetic disk (including a flexible disk), an optical disc (including a Blu-ray disc, a CD-ROM, and a DVD, a magneto optical disc (including a MD (Mini Disc)), a semiconductor memory and the like which are distributed to deliver a program to a user, separately from an apparatus body with the program recorded therein. Alternatively, the recording medium is also configured by the ROM 72, a hard disk included in the storage unit 78, and the like, which are delivered to a user in the state of being incorporated in advance into the apparatus body with the program recorded therein.

In the computer device 70, when dynamic image data is input through a reception operation by the communication unit 79, or a reproduction operation in the drive 80 (removable medium 81) or the recording unit 78, the CPU 71 executes the functions of the subject distance change determination unit 3 and the main subject determination unit 2 described above based on the program. In other words, by executing the process of FIGS. 2, 6, 8, 10, and 14, a main subject can be determined automatically regarding the input image data.

9. Modification Examples

Various modification examples of the above-described embodiments can be considered.

For example, in the third embodiment, the example in which the tendency toward recession is determined with the idea of the size determination scheme described in FIG. 2B has been described. However, even in the case of the block determination scheme described in FIG. 2C, the tendency toward recession can also be determined and the main subject can be determined among receding subjects (blocks BK). For example, Step F203 of the process in FIG. 14 may be modified such that the distance change amount "bDiff(m)=Db(m)pre-Db(m)" is calculated. By doing so, the block of the tendency toward recession can be determined even in the case of the block determination scheme.

The various processes have been described in the determination of the tendency toward approach and the determination of the tendency toward recession, but an approach determination mode and a recession determination mode may be switched according to a subject targeted by the user. For example, when a person such as a child is photographed, the approach determination mode is selected. Then, the process of the first embodiment is performed. On the other hand, when a train, an airplane, a wild bird, or the like is desired to be photographed, the recession determination mode is selected. Then, for example, the process of the third embodiment is performed.

The approach determination mode and the recession determination mode may be automatically switched according to a camera mode (a landscape mode, a portrait mode, or the like).

The approach determination and the recession determination can also be considered to be performed simultaneously in parallel. In this case, for example, the main subject is considered to be determined at a time point at which a corresponding subject is searched for in either the tendency toward approach or the recession.

The setting of the time threshold value Tht and the distance determination threshold value Thd described in each embodiment can be appropriately modified according to a product which is the imaging apparatus 10 or the image processing device 1, a use form, or the like. The user may be configured to set any desired values.

By setting the time threshold value Tht or the distance determination threshold value Thd, a criterion of the main subject image (the candidate image frame E(n) or the block BK(m)) can be modified. By setting the time threshold value Tht, swift determination can be selected and prioritized or high certainty determination can be selected and prioritized.

In addition, the main subject information has been described as also being used in an image effect process and an image editing process, however, it is also preferable to perform the main subject determination process targeting a reproduced image to this end.

The main subject determination process targeting a reproduced image is of course assumed in the image processing device of FIG. 1, the information processing device of FIG. 19, and the like.

In addition, a result of the main subject determination process may be added to still image data or dynamic image data imaged and recorded thereafter as metadata. In other words, information representing a main subject is added to a still image file, or the like.

In addition, manipulation of designating a main subject through manipulation by a photographer may be set to be possible while a through image is displayed and, at the same time, the main subject determination process is performed.

Furthermore, the process of determining a main subject has been described mainly on the assumption of capturing still images in the embodiments, however, the process of the embodiments described above can be applied as a process of performing main subject determination on a plurality of captured frames during standby for capturing a dynamic image, and capturing and execution of recording of a dynamic image.

Additionally, the present technology may also be configured as below.

(1)

An image processing device including:

a subject distance change determination unit configured to detect a temporal change of a distance from an imaging position to each subject present in an image and determine a tendency toward approach or recession of the each subject with respect to the imaging position on the basis of the detection; and a main subject determination unit configured to determine a main subject on the basis of the tendency toward approach or recession of the each subject determined by the subject distance change determination unit.

(2)

The image processing device according to (1), wherein the subject distance change determination unit determines the tendency toward approach of the each subject to the imaging position on the basis of information regarding the temporal change of the distance of the each subject, and wherein the main subject determination unit determines the main subject on the basis of a determination result of the tendency toward approach.

(3)

The image processing device according to (1) or (2), wherein the subject distance change determination unit detects a temporal change of a size of a subject image in the image as the temporal change of the distance.

(4)

The image processing device according to any one of (1) to (3), wherein the subject distance change determination unit detects, as the temporal change of the distance, a temporal change of a size of a subject image in the image, the subject image being one or more of candidate images extracted in the image.

(5)

The image processing device according to any one of (1) to (4), wherein the subject distance change determination unit determines that the subject that is approaching on average, cumulatively, or continuously is a subject with the tendency toward approach, as a detection result of the temporal change of the distance, and wherein the main subject determination unit determines a part or all of the subject determined to have the tendency toward approach as the main subject.

(6)

The image processing device according to any one of (1) to (5), further including:

an attribute identification unit configured to identify an attribute of the subject and output attribute information, wherein the subject distance change determination unit changes a determination condition of the tendency toward approach of the subject according to the attribute information.

(7)

The image processing device according to (1) or (2), wherein the subject distance change determination unit detects the temporal change of the distance of the subject in each division region in the image.

(8)

The image processing device according to (7), wherein the subject distance change determination unit determines a division region at which the subject of the division region of a current processing target image is located in an image before a unit time and detects the temporal change of the distance of the subject as a difference between a subject distance of the determined division region and a subject distance of the division region of the current processing target image.

(9)

The image processing device according to claim (7) or (8), wherein the subject distance change determination unit determines that the subject of the division region that is approaching on average, cumulatively, or continuously is the subject with the tendency toward approach, as a detection result of the temporal change of the distance, and wherein the main subject determination unit determines the main subject on the basis of information regarding the division region in which the subject is determined to have the tendency toward approach.

(10)

The image processing device according to (9), wherein the main subject determination unit groups different division region in which a same subject as the subject contained in one division region in which the subject is determined to have the tendency toward approach is contained, and sets an image range serving as the main subject based on a range of the grouped one or more of division regions.

(11)

The image processing device according to (10), wherein the main subject determination unit groups the one division region and the different division region for which a distance difference of a subject distance is within a predetermined value and which is a region continuous with the one division region.

(12)

The image processing device according to (1), wherein the subject distance change determination unit determines the tendency toward recession of the each subject from the imaging position on the basis of information regarding the temporal change of the distance of the each subject, and wherein the main subject determination unit determines the main subject on the basis of a determination result of the tendency toward recession.

REFERENCE SIGNS LIST 1 image processing device
2 main subject determination unit
3 local motion detection unit
4 global motion detection unit
10 imaging apparatus
11 optical system
12 imager
13 optical system drive unit
14 sensor unit
15 recording unit
16 communication unit
17 distance sensor
20 digital signal processing unit
21 pre-processing unit
22 synchronization unit
23 YC generation unit
24 resolution conversion unit
25 codec unit
27 candidate detection unit
28 attribute identification unit
29 distance calculation unit
30 control unit
30a main subject determination unit
30b distance change determination unit
32 UI controller
33 user interface
34 display unit
35 manipulation unit
70 computer device
71 CPU

The invention claimed is:

1. A hand-held camera comprising:
an image sensor configured to capture an image;
a subject distance change determination circuitry configured to
  detect a temporal change of a distance from an imaging position to each subject of a plurality of subjects present in the image, and
  determine a tendency toward recession of the each subject of the plurality of subjects with respect to the imaging position on a basis of the temporal change of the distance from the imaging position to the each subject; and
a main subject selection circuitry configured to
  select a first main subject on a basis of the tendency toward recession of the each subject of the plurality of subjects that has been determined by the subject distance change determination circuitry, wherein the first main subject has a tendency towards recession, and
  responsive to selecting the first main subject, control a function of the hand-held camera to change the image captured by the image sensor, the function is one selected from a group consisting of:
    an auto-focus function,
    an exposure function, or
    a zoom function; and
a control circuitry configured to
  receive a still image capture input, and
  responsive to receiving the still image capture input, control a memory to store a still image of the first main subject based on the main subject selection circuitry controlling the function of the hand-held camera to change the image captured by the image sensor.

2. The hand-held camera according to claim 1, wherein the subject distance change determination circuitry is further configured to determine a tendency toward approach of the each subject to the imaging position on a basis of information regarding the temporal change of the distance of the each subject, and wherein the main subject selection circuitry is further configured to select a second main subject on a basis of only the tendency toward approach of the each subject.

3. The hand-held camera according to claim 1, wherein, to detect the temporal change of the distance, the subject distance change determination circuitry is further configured to detect the temporal change of a size of a subject image in the image.

4. The hand-held camera according to claim 1, wherein, to detect the temporal change of the distance, the subject distance change determination circuitry is further configured to detect the temporal change of a size of a subject image in the image, the subject image being one or more of candidate images extracted in the image.

5. The hand-held camera according to claim 2,
wherein the subject distance change determination circuitry is configured to determine that the each subject that is approaching on average, cumulatively, or continuously is a subject with the tendency toward approach, as a detection result of the temporal change of the distance, and
wherein the main subject selection circuitry is configured to select a part or all of the subject that is determined to have the tendency toward approach as the second main subject.

6. The hand-held camera according to claim 1, further comprising:
an attribute identification circuitry configured to
identify an attribute of the subject, and
output attribute information on a basis of the attribute that has been identified,
wherein the subject distance change determination circuitry is configured to change a determination condition of the tendency toward recession of the subject according to the attribute information.

7. The hand-held camera according to claim 2, wherein the subject distance change determination circuitry is configured to detect the temporal change of the distance of the each subject in each division region in the image.

8. The hand-held camera according to claim 7, wherein the subject distance change determination circuitry is configured to
determine a division region at which the each subject is located in a second image before a unit time, and
detect the temporal change of the distance of the each subject as a difference between a first subject distance of the division region that has been determined and a second subject distance of a division region of the image that is a current processing target image.

9. The hand-held camera according to claim 7,
wherein the subject distance change determination circuitry is configured to determine that the each subject of the division region that is approaching on average, cumulatively, or continuously is a subject with the tendency toward approach, as a detection result of the temporal change of the distance, and
wherein the main subject selection circuitry is further configured to select the second main subject on a basis of information regarding the division region in which the subject is determined to have the tendency toward approach.

10. The hand-held camera according to claim 9, wherein the main subject selection circuitry is configured to
group a different division region in which a same subject as the subject contained in the division region that is determined to have the tendency toward approach, and
set an image range serving as the second main subject based on a range of one or more division regions that have been grouped.

11. The hand-held camera according to claim 10, wherein the main subject selection circuitry is configured to group the division region and the different division region for which a distance difference of a subject distance is within a predetermined value and which is a region continuous with the division region.

12. The hand-held camera according to claim 1, wherein responsive to selecting the first main subject, the main subject selection circuitry is further configured to control a second function of the hand-held camera to change the image captured by the hand-held camera, the second function is one selected from a second group comprising:
an edit function,
an image effect function, or
a tracking function.

13. The hand-held camera according to claim 1, wherein the control circuitry is further configured to
receive a video capture input, and
responsive to receiving the video capture input, control the memory to store a video of the first main subject based on controlling the function of the hand-held camera to change the image captured by the image sensor and in response to receiving the video capture input.

14. The hand-held camera according to claim 1,
wherein, to select the first main subject on the basis of the tendency toward recession of the each subject of the plurality of subjects that has been determined by the subject distance change determination circuitry, the main subject selection circuitry is further configured to select only one subject from the plurality of subjects as the first main subject.

15. A method for controlling a hand-held camera, the method comprising:
capturing, with an image sensor of the hand-held camera, an image;
detecting, with control circuitry of the hand-held camera, a temporal change of a distance from an imaging position to each subject of a plurality of subjects present in the image captured by the image sensor of the hand-held camera;
determining, with the control circuitry, a tendency toward recession of the each subject of the plurality of subjects with respect to the imaging position on a basis of the temporal change of the distance from the imaging position to the each subject;
selecting, with the control circuitry, a main subject on a basis of the tendency toward recession of the each subject of the plurality of subjects, wherein the main subject has a tendency towards recession;
controlling, with the control circuitry, a function of the hand-held camera to change the image captured by the image sensor in response to selecting the main subject, the function is one selected from a group consisting of:
an auto-focus function,
an exposure function, or
a zoom function;
receiving, with the control circuitry, a still image capture input; and
controlling, with the control circuitry, a memory to store a still image of the main subject based on controlling the function of the hand-held camera to change the image captured by the image sensor and in response to receiving the still image capture input.

16. The method according to claim 15, further comprising:
controlling, with the control circuitry, a second function of the hand-held camera to change the image captured by the hand-held camera in response to selecting the main subject, the second function is one selected from a second group comprising:
an edit function,
an image effect function, or
a tracking function.

17. The method according to claim 15, further comprising:
receiving a video capture input; and
controlling the memory to store a video of the main subject based on controlling the function of the hand-held camera to change the image captured by the image sensor and in response to receiving the video capture input.

18. The method according to claim 15, wherein selecting the main subject on the basis of the tendency toward recession of the each subject of the plurality of subjects further includes selecting only one subject from the plurality of subjects as the main subject.

19. A non-transitory computer-readable medium comprising a program that, when executed by an arithmetic processing device, causes the arithmetic processing device to perform a set of operations, the set of operations comprising:
detecting a temporal change of a distance from an imaging position to each subject of a plurality of subjects present in an image captured by an image sensor of a hand-held camera;
determining a tendency toward recession of the each subject of the plurality of subjects with respect to the imaging position on a basis of the temporal change of the distance from the imaging position to the each subject;
selecting a main subject on a basis of the tendency toward recession of the each subject of the plurality of subjects, wherein the main subject has a tendency towards recession;
controlling a function of the hand-held camera to change the image captured by the handheld camera in response to selecting the main subject, the function is one selected from a group consisting of:
an auto-focus function,
an exposure function, or
a zoom function;
receiving a still image capture input; and controlling a memory to store a still image of the main subject based on controlling the function of the hand-held camera to change the image captured by the image sensor and in response to receiving the still image capture input.

20. The non-transitory computer-readable medium according to claim 19, the set of operations further comprising:
controlling a second function of the hand-held camera to change the image captured by the hand-held camera in response to selecting the main subject, the second function is one selected from a second group comprising:
an edit function,
an image effect function, or
a tracking function.

21. The non-transitory computer-readable medium according to claim 19, the set of operations further comprising:
receiving a video capture input; and
controlling the memory to store a video of the main subject based on controlling the function of the hand-held camera to change the image captured by the image sensor and in response to receiving the video capture input.

22. The non-transitory computer-readable medium according to claim 19, wherein selecting the main subject on the basis of the tendency toward recession of the each subject of the plurality of subjects further includes selecting only one subject from the plurality of subjects as the main subject.

* * * * *